United States Patent
Goodwin et al.

(10) Patent No.: US 10,521,496 B1
(45) Date of Patent: Dec. 31, 2019

(54) RANDOMIZE MARKUP TO DISTURB SCRAPERS

(71) Applicant: Amazon Technologies, Inc., Reno, NV (US)

(72) Inventors: Samuel Charles Goodwin, Seattle, WA (US); John Lindsay Bates, Seattle, WA (US); Mark Evans Brighton, Seattle, WA (US); Sevag Demirjian, Seattle, WA (US); Colin James Hawkett, Seattle, WA (US); Blair Livingstone Hotchkies, Bellevue, WA (US); Forrest MacKenzie Vines, Covington, WA (US)

(73) Assignee: Amazon Technologies, Inc., Seattle, WA (US)

( * ) Notice: Subject to any disclaimer, the term of this patent is extended or adjusted under 35 U.S.C. 154(b) by 658 days.

(21) Appl. No.: 14/147,389

(22) Filed: Jan. 3, 2014

(51) Int. Cl.
*G06F 17/00* (2019.01)
*G06F 17/21* (2006.01)
*G06F 21/00* (2013.01)

(52) U.S. Cl.
CPC .................................. *G06F 17/218* (2013.01)

(58) Field of Classification Search
CPC ........... G06F 17/30572; G06F 17/2247; G06F 17/227; G06F 17/30893; G06F 16/95; G06F 21/00; G06F 21/50; G06F 21/566; G06F 21/54; G06F 21/57
See application file for complete search history.

(56) References Cited

U.S. PATENT DOCUMENTS

| | | | |
|---|---|---|---|
| 5,450,593 | A | 9/1995 | Howell et al. |
| 6,981,217 | B1 | 12/2005 | Knauft et al. |
| 7,003,800 | B1 | 2/2006 | Bain |
| 7,188,241 | B2 | 3/2007 | Cronce et al. |
| 7,322,006 | B1 | 1/2008 | Ohashi |
| 7,475,242 | B2 | 1/2009 | Baird et al. |
| 7,797,354 | B2 | 9/2010 | Sattler et al. |

(Continued)

OTHER PUBLICATIONS

Pixel2life.com, "Converting Tables to a CSS Div Tag and XHTML validated layout", Feb. 23, 2011:1-10, http://www.pixel2life.com/publish/tutorials/33/converting_tables_to_a css_div_tag_and_xhtml_validated_layout/.

(Continued)

*Primary Examiner* — Ariel Mercado
(74) *Attorney, Agent, or Firm* — Davis Wright Tremaine LLP

(57) ABSTRACT

Network resources are subject to automated downloading of information by automated-agents that cause business- or user-specific data to be compiled en masse. In order to control resources and information available to automated-agents, markup documents or elements of markup documents are obfuscated such that a client must reconfigure the obfuscated information in order to display the requested content contained in the document. The obfuscation is applied such that the content will render and display to a human user in the same manner as if the element was untransformed; however, the markup will appear syntactically different to an automated-agent. Thus, in response to a user request, a server can transform elements of a structured document and provide the transformed document to the client for reconfiguring and rendering.

20 Claims, 15 Drawing Sheets

(56) References Cited

U.S. PATENT DOCUMENTS

| | | |
|---|---|---|
| 7,802,305 B1 | 9/2010 | Leeds |
| 7,805,673 B2 | 9/2010 | der Quaeler et al. |
| 8,255,393 B1 * | 8/2012 | Yu .................. H04L 63/1441 |
| | | 707/724 |
| 8,312,297 B2 | 11/2012 | Sato et al. |
| 8,584,005 B1 | 11/2013 | Pittenger et al. |
| 8,621,652 B2 | 12/2013 | Slater, Jr. |
| 8,769,692 B1 | 7/2014 | Muttik et al. |
| 8,904,279 B1 * | 12/2014 | Bougon ................ G06F 21/44 |
| | | 715/236 |
| 9,124,560 B1 | 9/2015 | Vemula et al. |
| 9,251,090 B1 | 2/2016 | Borthakur et al. |
| 9,369,544 B1 | 6/2016 | Morgan et al. |
| 9,420,049 B1 * | 8/2016 | Talmor ................ H04L 67/02 |
| 9,477,836 B1 | 10/2016 | Ramam et al. |
| 2004/0117654 A1 * | 6/2004 | Feldman ............ G06F 21/6218 |
| | | 726/22 |
| 2006/0010148 A1 | 1/2006 | Sattler et al. |
| 2006/0075228 A1 | 4/2006 | Black et al. |
| 2008/0181396 A1 | 7/2008 | Balakrishnan et al. |
| 2009/0141895 A1 | 6/2009 | Anderson et al. |
| 2009/0144829 A1 * | 6/2009 | Grigsby ............ G06F 21/6263 |
| | | 726/26 |
| 2009/0158430 A1 | 6/2009 | Borders |
| 2010/0005306 A1 | 1/2010 | Izu et al. |
| 2010/0332993 A1 * | 12/2010 | Bousseton ............ G06Q 30/02 |
| | | 715/738 |
| 2011/0107204 A1 | 5/2011 | Cohen et al. |
| 2012/0159296 A1 | 6/2012 | Rebstock et al. |
| 2013/0042306 A1 | 2/2013 | Hou et al. |
| 2013/0198203 A1 * | 8/2013 | Bates .................. G06Q 30/02 |
| | | 707/748 |
| 2014/0013451 A1 * | 1/2014 | Kulka .................. G06F 21/14 |
| | | 726/29 |
| 2014/0108308 A1 | 4/2014 | Stout et al. |
| 2014/0108542 A1 * | 4/2014 | Cheng .................. H04L 65/403 |
| | | 709/204 |
| 2014/0283038 A1 * | 9/2014 | Call .................. H04L 63/1441 |
| | | 726/22 |
| 2016/0005029 A1 * | 1/2016 | Ivey .................. G09C 1/00 |
| | | 705/44 |
| 2017/0228762 A1 | 8/2017 | Riviello et al. |

OTHER PUBLICATIONS

How to Phish, Protect Your Email, and Defeat Copy-and-Paste With CSS, Oct. 1, 2010, pp. 1-4. http://www.azarask.in/blog/post/protecting-email-with-css/.

Retrologic Systems, (Jun. 26, 2010), pp. 1-3. http://www.retrologic.com/retroguard-faq.html.

About.com, Comments on Comments, (Feb. 18, 2009), pp. 1-4. http://webdesign.about.com/od/beginningtutorials/a/aa050503a.htm.

Cross-Site Request Forgeries, Dec. 2004, pp. 1-6 http://shiflett.org/articles/cross-site-request-forgeries.

Blake, "Simple Techniques to Lock Down your Website," dated Oct. 2, 2009, retrieved from https://code.tutsplus.com/tutorials/simple-techniques-to-lock-down-your-website--net-7035, 23 pages.

* cited by examiner

RANDOMIZE MARKUP TO DISTURB SCRAPERS

BACKGROUND

The presence of automated-agents on system networks is becoming common practice for the purpose of automatically discovering and scanning webpages and downloading the data en masse. Automated-agents, commonly referred to as robots, intelligent agents, scrapers, indexers or bots, may be configured or programmed to parse a web document for many purposes, including for retrieving data associated with specific reference markers. This type of general-purpose processing enables automated-agents to retrieve information at a large scale. While crawling policies exist, such as avoiding overloading websites, many bots are malicious and cause increased costs and resources for the website and server(s) hosting the website. Bots can further crawl websites fetching large batches of data at high velocity, enabling scraping of a company's data, which may include company-specific information, such as an amount of product inventory, availability of products, current prices of items, reviews of products and additional information that a company is willing to provide to human users at a low velocity or on a one-time basis. Currently, techniques for stopping or delaying automated traffic from scraping or crawling websites and webpages are limited to signature detection and user blocking.

BRIEF DESCRIPTION OF THE DRAWINGS

Various embodiments in accordance with the present disclosure will be described with reference to the drawings, in which.

DETAILED DESCRIPTION

Figure 1:
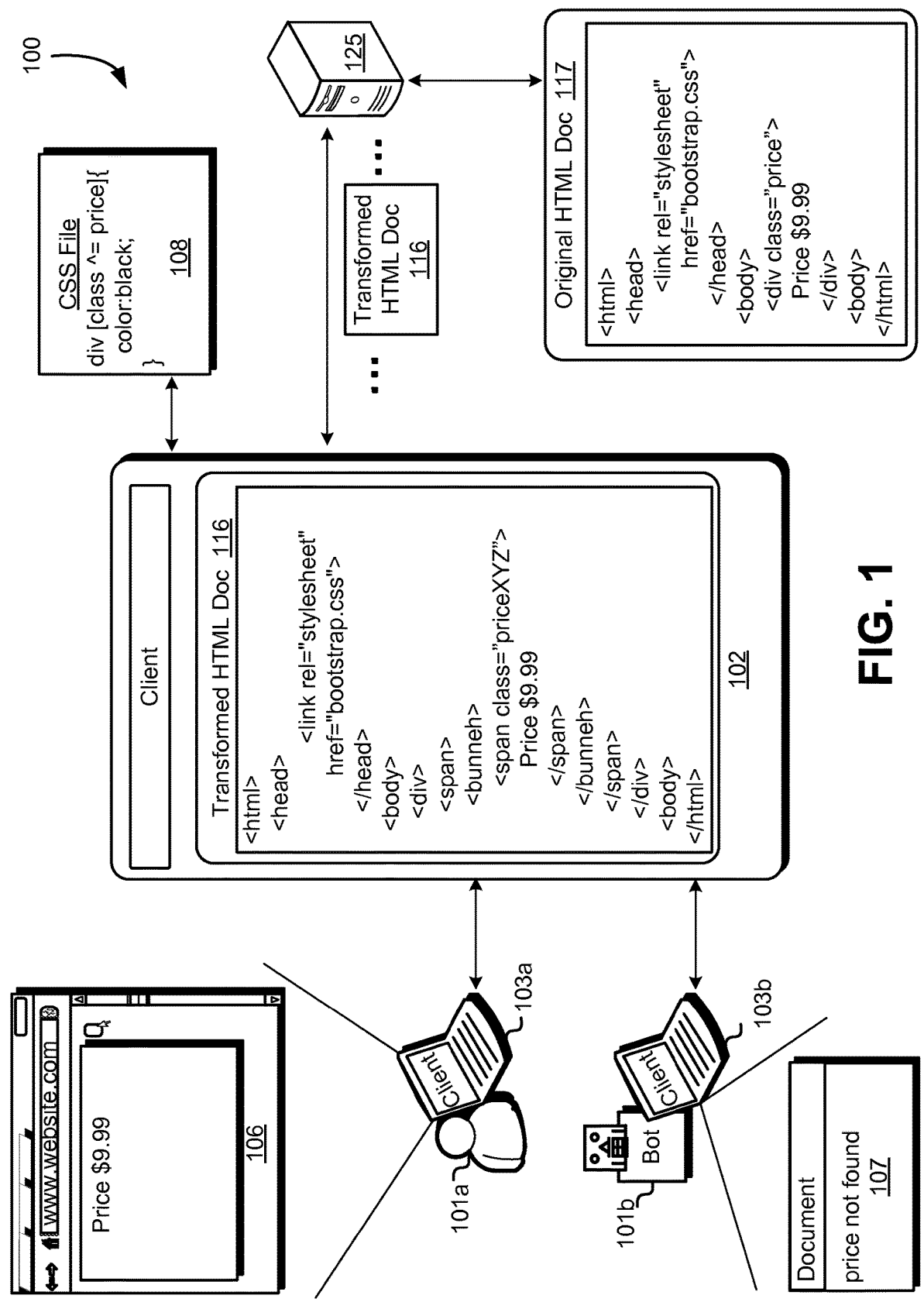
FIG. 1 is an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Many organizations provide public access to data for various reasons. Some organizations, for instance, operate electronic commerce marketplaces through which customers are able to purchase or otherwise consume items offered in the marketplace. Other organizations may compile various statistics regarding the stock market, the weather, sporting events and/or other topics. While providing public access is often advantageous, such as for providing an easy customer experience, it is often beneficial to enforce restrictions on the access of data. Electronic commerce companies, for example, do not want to provide automated-agents with business information, such as pricing details and inventory, which can be downloaded and used for unauthorized purposes. Similarly, electronic commerce and other companies often provide certain data, but in a manner that provides less strain on systems than caused by automated-agents. Example embodiments presented herein enable greater control over access to data and include methods and systems to discourage the use of automated-agents to access a website's information by providing a different markup document or different portions of a markup document each time the webpage is requested. By discouraging automated-agents from using the webpage, it will lower costs by driving away bots and continue to allow human-users to receive information on an as-needed or one-off basis as requested by the individual.

Example embodiments of techniques described and suggested herein include methods and systems for deploying a mechanism for stopping or causing difficulty or problems for automated traffic scraping websites. Example embodiments can include automatically modifying a markup page or returning a markup document in an obfuscated manner in such a way that a webpage renders correctly on a client-side device, but is syntactically different from the original markup document provided by a server. Obfuscating reference markers or other parts of elements of a markup document increases the difficulty for automated-agents to parse the markup document in order to search for wanted content.

Example embodiments may include a structured document being dynamically created to obfuscate certain elements or portions of elements in the markup document. A document that is dynamically produced by the server in response to received requests can help deter automated-agents from scraping or even accessing the webpage. Web crawlers may be configured for different types of crawling, for example, a bot may be configured for restricted link crawling or focused crawling, which are directed toward certain/specific information on the webpage. If an automated-agent is designed to fetch and record data related to a current amount of a product in stock, the bot may query for specific key terms, elements or variables. When a response received from the server includes the queried information, the bot will download and/or catalogue the data or content associated therewith. However, if a bot searches reference markers, and those reference markers have been obfuscated, the bot will fail to locate and/or download the content of the reference marker.

Many automated-agents are prone to unanticipated errors that cannot be designed for or anticipated by the bot. Many bots are able to ignore such unanticipated errors by storing a log of errors and fetching the next Uniform Resource Locator (URL) in the sequence; however, if a large number of unanticipated errors occur, a bot can fail or give up. As automated-agents generally ignore images and stylesheets, markup documents or portions of markup documents may be transformed prior to being provided to a client and the instructions for reconfiguring the original or untransformed portion of the markup document may be provided to the client as part of an image or a stylesheet, which would generally not be parsed by the bot.

Further example embodiments may include a server or process to obfuscate elements or parts of elements of a web document with a different amount of difficulty. For example, a server or interceptor configured to transform elements may apply multiple transformations to a single element identifier that would require a client to parse an associated style sheet at multiple levels or multiple times in order to render a webpage using the reconfigured untransformed identifier in order to display the webpage on a user device with the requested content.

While automated-agents generally crawl webpages automatically in order to filter and correlate data, currently and generally, software agents are dependent on semantic clarity of webpages. In order for most automated-agents to crawl webpages successfully, the bot must be programmed to locate text within a HyperText Markup Language (HTML) document and extract the meaning of the text based on the semantic structures of the document. However, current and future software agents, such as semantic agents, may be able to filter and correlate previously unrelated data without the need for the same semantic clarity. Example embodiments can provide a method and system for masking or randomizing identifiers and class names, for example, in a manner that would obfuscate the tags or reference markers being parsed, thereby effectively causing a bot to fail to access the requested information. Example embodiments may include a randomizing or transforming markup in a different manner in response to each request. For example, a first request may receive a first transform of the original identifier "price" to be "ecirp" and a second request may receive a different markup that transforms the original identifier "price" to be "asdfgqwert." Each attempt a bot or user makes at requesting a page, would return a different markup document or a different randomized identifier.

An example embodiment can include a server receiving a request from a client for a price of an item. The server is configured to create a markup document in a markup language, such as HTML, to provide the requested price information. The created HTML document includes a class name "price," which lists the price content as $9.99 for the product. The server can provide the configured HTML document to an interceptor. The interceptor can be a module of the server or a separate server or process or the like that is operably interconnected with the server. The interceptor can transform the class name "price" to another class name. For example, the class name "price" would be transformed to a class name "transformXYZ" and the interceptor would serve the HTML document to the client. The corresponding style sheet, such as a Cascading Style Sheet (CSS) file, would similarly be configured or re-configured to associate the original class name "price" with the transformed class name "transformXYZ" and the re-configured CSS file would similarly be provided to the client for rendering a webpage. At the client, the transformed HTML document would be parsed along with the CSS file to render the webpage to display the price as $9.99. However, should an automated-agent be parsing the HTML document querying for the class name "price," it would fail to find the requested class name, and thus, fail to download the content, i.e., $9.99. Thus, in the example embodiment, the client web browser would successfully display the webpage in its original requested form based on the transformed element being untransformed at or by the client, but the same transformed HTML document would cause the bot to fail for its intended purpose.

Alternative example embodiments include using internal or inline styles to override any or all of an external CSS file when transforming a markup document or identifiers of a markup document. Such example embodiments enable the external CSS file and the transformed HTML document do not have to be synchronized or maintained in sync in order to randomize or obfuscate elements of the markup document correctly. For example, the external CSS returned to the client 108 may style the price as div.price {color:black;}; however, an internal style may be added inline to the transformed HTML document 116 for the obfuscated element during the transformation process:
    <head>
      <style type="text/css">
        span.xyz {color:black;}
      </style>
    </head>
In addition, the transformed HTML document 116 can select the style based on the obfuscated class attribute without referencing the term "price" in the markup:
    <div>
      <span class="xyz">
        Price $9.99
      </span>
    </div>

Example embodiments may use a headless browser to validate that the obfuscated document or obfuscated elements of the document render in the same manner by comparing a rendered image of the original webpage with a rendered image of an obfuscated document. If the obfuscated document is identical to the original webpage once rendered, or within a threshold, the obfuscated document is considered to render correctly. A headless browser is typically a client without a graphical user interface (GUI); headless browsers are typically accessed from a command line or prompt and used for automated testing of webpages. In testing the obfuscated webpage for accuracy, search engine optimization (SEO) will not be negatively affected and SEO automated-agents may be identified based on their user agent. Identifying the SEO bots can allow for returning the original web document, versus the obfuscated web document, to the bot.

A markup document, sometimes referred to as a webpage, web document or structured document, is written in a markup language such as HTML. The markup language is a set of tags that describe the content of the document; tags, when parsed by a client, become elements of a webpage. The HTML elements represent semantics and structure of a document and can consist of multiple parts, including, for example, attributes, text, content and other elements. The portions of the web document, such as reference markers, identifiers, class names and other attributes of a tag can be obfuscated for many purposes, including, for example, for concealing the tag such that displaying the content of an element requires reconfiguring or deciphering the original (unobfuscated) tag.

The presentation and style of a webpage to be rendered to a client device is primarily provided for by linking the HTML document to an external document such as a style sheet, image file, scripts or other design-based object; presentation schemas may also be embedded instructions within a document. As favoring the separation of concerns grows, e.g., separating structure from the presentation of a document, HTML is used to represent the structure and/or content of a document and a style sheet, such as a Cascading Style Sheet (CSS) file, is being used for the presentation of the document. Example embodiments can use this separation of concerns to configure a web document in a manner that would render the webpage in the same way in a visual display, but would cause a failure or a fault to an automated-agent trying to download the data without the style information necessary to reconfigure the obfuscated attribute successfully into the original or unobfuscated attribute.

An element of an HTML document may be assigned an identifier and class information. The HTML attribute "id" assigns a name to an element, where each name is unique in the HTML document. The id attribute has many purposes including, for example, being a style sheet selector, a means to reference a particular element, for general purpose processing by automated-agents, etc. For example, a bot may parse the id for identifying fields when extracting data from the HTML document into a database or translating the HTML document into a different format. An HTML attribute is a modifier of an HTML element. An identifier attribute provides a unique identifier for an element in that specific document. The element identifier can then be used as a selector in CSS to alter the contents or presentation of the identified element before or while being rendered and displayed by a browser.

The class attribute assigns one or more class names to an element. The class name attribute also has multiple roles in HTML, for example, the class attribute may act as a style sheet selector for assigning style information to a set of elements, for general purpose processing by automated-agents, etc. These and other attributes may be used in conjunction with the SPAN element to markup document content, which, when rendered in conjunction with the CSS style rules associated therewith, would instruct a visual user agent, such as a web browser, to display the rendered content on a user device. The class name attribute can be configured to classify similar elements of a document used to change the presentation of all elements in the class or to change the semantics of the class elements.

HTML DIV and SPAN tags, when used in conjunction with the id and class attributes, provide a generic mechanism for adding structure and organization to markup documents. The SPAN tag defines the content to be inline, while the DIV tag defines the content to be block-level. Generally, other than that, SPAN tags and DIV tags have no specific meaning other than generic grouping of content; as such, these elements are commonly used for organizational or stylistic purposes without defining extra meaning. For example, a browser configured for displaying visual content (as opposed to a client configured to render non-visual content such as speech) may use line breaks before and after DIV tags; however, the same effect could be implemented by configuring a SPAN tag to display in the same manner as the DIV tag.

FIG. 1 is an illustrative example of an environment in which various embodiments can be implemented. In various embodiments, the communication system 100 includes a human user 101a and an automated-agent 101b using respective user devices 103a and 103b, which are operably interconnected to a server apparatus 125 via a network (not shown). The user devices are configured to run a client 102, such as an application or a web browser, for initiating communication with the server. The client could also be an automated-agent, such as the bot 101b, using a device 103b to interact with the server 125 directly or indirectly. Alternative exemplary embodiments may disclose a client being executed on a remote server (e.g., via the SILK® browser model).

The server 125 may be a hardware apparatus, for example, a computer or computer system, and/or may be implemented as a software application or process running on the computer or computer system. One or more user devices may be operably interconnected to one or more servers or clusters via a network or intermediary networks. The one or more devices may connect to the servers via one or more clients, where the clients may be the same or different applications and may similarly communicate with other destination devices coupled to the network or intermediary networks.

The user devices 103a and 103b may include a desktop personal computer, workstation, laptop, personal digital assistant (PDA), cell phone or any wireless application protocol (WAP)-enabled device or any other computing device configured to interface directly or indirectly to the Internet. The client 102 may run a network interface application or software application, which may, for example, be a browsing program to enable users to locate and access information provided by a server. Such a server may be a web server where the browsing application is primarily configured for use of the World Wide Web, but could also access information in private networks or files in file systems. The client 102 may also run a WAP-enabled browser executing on a cell phone, PDA, other wireless device or the like. The network interface application may allow a user of the client to access, process and view information and documents available to it from servers in the system, such as the server 125 or servers operably interconnected therewith.

A human user 101a and/or an automated-agent 101b may control (e.g., via user input and/or automated instructions) a respective client to send a request message to a server with a request for a specific resource, content, information or the like using Hypertext Transfer Protocol (HTTP) or other appropriate protocols. The request messages may be electronic request messages submitted over the Internet via a web client, and may be provided to the server for processing. The server 125 may be configured to process a request and respond to the request, for example, by providing a markup document, such as a structured document or a HyperText Markup Language (HTML) document. The server may respond to the users via their respective web clients in the same or different manner. Other embodiments may include a request being a request for network resources, for example, a request for a website, webpage, client application, mobile application or other resources currently known or hereinafter developed.

The Cascading Style Sheet (CSS) file 108 can be any style sheet served directly from a data store, cache, file or the like located at or operably interconnected to the server 125. In alternative example embodiments, the CSS file 108 can be stored or cached in memory or cached on a disk at the client. A CSS file could be dynamically created by the server at, or near, the time the HTML document is generated by the server. As the HTML document can, for example, reference an external CSS sheet, the web browser can call the sheet stored in the browser's cache, which can include a browser maintaining the same CSS sheet to be used for multiple web documents without being reloaded, a cached CSS sheet must also be able to reconfigure any transformed elements or contents.

In example embodiments, as the browser downloads the webpage it parses the HTML, which instructs the browser whether to download other images, scripts, styles, etc., it builds the DOM and renders the webpage on the display screen of the user device. If the browser encounters a script, such as JavaScript® code, the browser will pause the HTML parsing and execute the script before continuing to build the DOM and render the webpage for display. In such an example embodiment, as the browser would encounter a CSS style sheet while rendering the webpage, the CSS document instructs the browser to render the content, requested by the user, as though the markup obfuscation was performed.

In the example embodiment illustrated in FIG. 1, the original HTML document 117 generated by the server 125 may contain price data being enclosed within a DIV, which would have the class identifier having a descriptive ID to aid an automated-agent to find the price of an item. However, the transformed HTML document 116 may obfuscate the price identifier in multiple ways and/or at multiple levels in order to confuse the automated-agent, thereby making it more difficult or impossible for a bot to scrape the price data. For example, the price identifier is transformed from "price" to "priceXYZ" and enclosed in a SPAN instead of a DIV. The identifier is further obfuscated by adding additional SPAN and DIV elements within the markup document in order to confuse an automated-agent without changing or altering the visual display of the webpage when the structured document is rendered for display on a user device. The transformed HTML document 116, when rendered by the client with the CSS file 108, will display the price data no matter if it is enclosed in a DIV or a SPAN or if the class identifier begins with "price."

Alternative example embodiments may transform one element of an HTML document into another HTML element, for example, a SPAN element may be replaced with a DIV element, or vice versa. Alternative example embodiments may transform one element of an HTML document into another HTML element, for example, a SPAN element may be replaced with a DIV element, or vice versa. Further example embodiments may include replacing a common HTML tag with a custom tag element; for example, a DIV tag can be replaced with a customized tag "bunneh." Any custom made tag can be made to behave like any other HTML tag using CSS.

A class attribute name or an identifier name associated with an element of the markup document can be transformed such that an element identifier "productDescription" can be randomized to "product12345ABC" and the original identifier and the randomized identifier can be mapped in a table or list, or used as a key to associate the two identifiers. In such an example embodiment, the randomized identifier can be provided to a client in the transformed HTML document, and, when rendered at the client, the associated CSS sheet or JavaScript® script can be parsed to render the webpage correctly using the randomized element. The mapping or other form of associating two or more element transformations is accomplished such that the original relationship among the elements is preserved and all elements or corresponding elements that reference the original element identifier will similarly be preserved. Thus, when the content of the element identifier is rendered on a webpage 106 of the human user device 103a, the content is displayed as though no obfuscation of the markup was done; however, a bot would fail to retrieve the requested data and would return a document or database 107 with "price not found." Alternative example embodiments can include a transformation or obfuscation system or method to transform the element identifier to a different identifier with semantic meaning.

Figure 2:
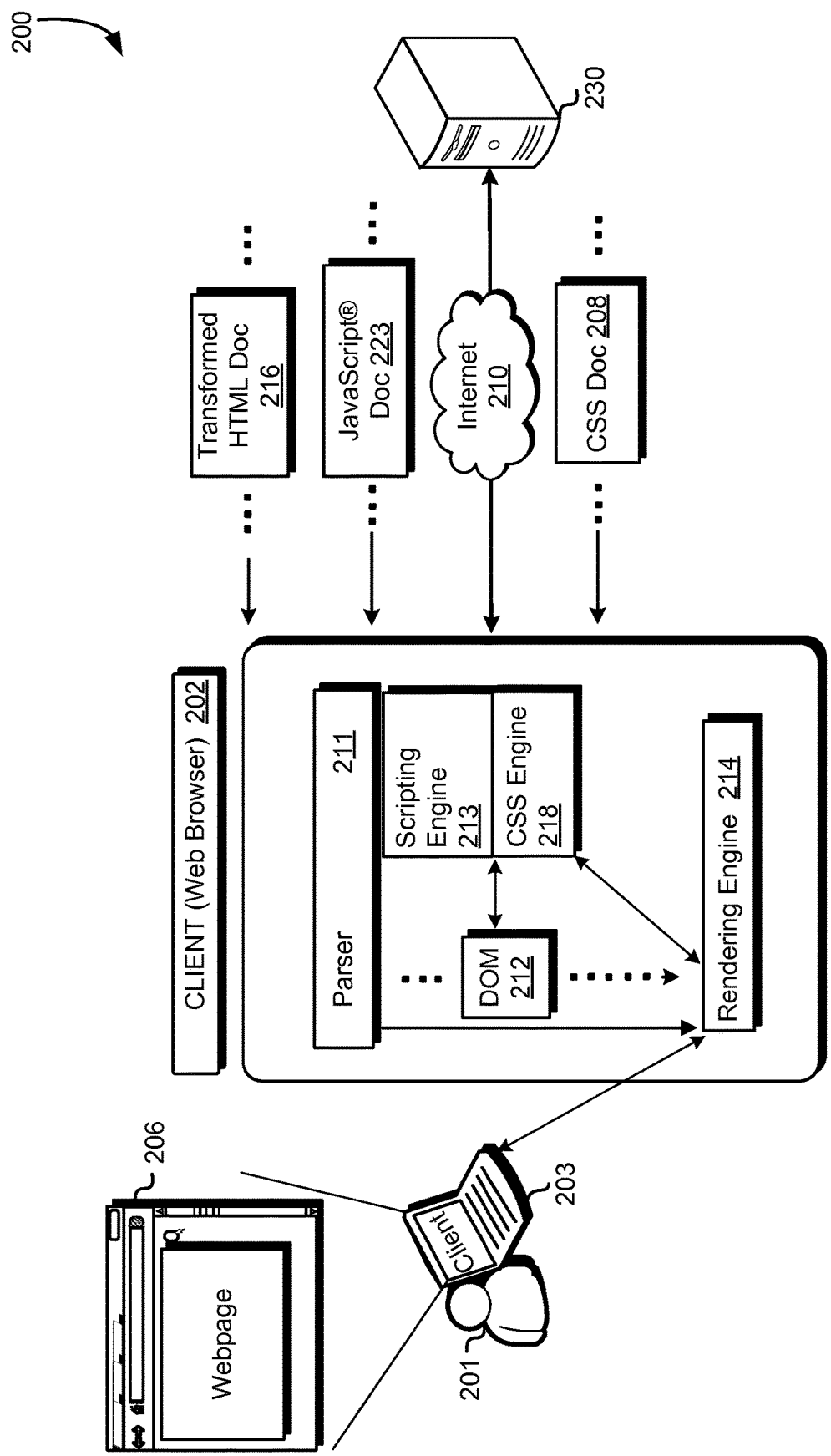
FIG. 2 is an illustrative example of an environment in which various embodiments can be implemented.

FIG. 2 is an illustrative example of an environment 200 in which various embodiments can be implemented. A web server 230 can be a computer or system configured to share a resource or the computer application to help deliver the content being accessed. For example, the web server 230 can be a server, such as the server 125 in FIG. 1, configured to host a website. Example embodiments may include a website, including a set of documents and/or resources that are available via a common domain.

Example embodiments of a client, such as the browser 202, may include a scripting engine 213 to interpret and execute embedded script in a web document, such as JavaScript® doc 223 and a CSS engine 218 to interpret and execute a style sheet, such as CSS doc 208. The JavaScript® script may be embedded or referenced in HTML pages or structured documents and configured to run locally on a user's browser, and the browser may execute the JavaScript® script to render or display the requested data. In alternative example embodiments, the web browser is configured to render the webpage content according to the HTML instructions of the webpage or according to a JavaScript® script embedded within the HTML, or called or referenced as a file within the HTML of the webpage. Example embodiments may access or call a JavaScript® function in order to further render the webpage or alter the markup document or CSS file before displaying the webpage to the user.

The browser 202, which can display a webpage 206 on a client device 203 of a human user 201, may be configured to parse the structured document, such as transformed HTML doc 216, received from the server 230 via the Internet 210. A JavaScript® module, such as the scripting engine 213, can access an output of a rendering engine, a style sheet, a content sheet and/or other modules and documents for rendering a display of the markup code received from a server. As the JavaScript® unit, accessed by or included in the client (such as a web browser or application), parses the HTML document, it re-renders the document object model (DOM) 212. In many scenarios, the parser 211, upon receiving the transformed HTML document 216 from the web server 230, will render a first (initial) static DOM. As the HTML document is parsed, the DOM is generally regenerated each time it is altered or modified by the scripting engine 213 or CSS engine 218.

The browser 202 or rendering engine 214 may further render the webpage according to instructions provided in a presentation or style document, such as a Cascading Style Sheets (CSS) document 208. Other such scripting languages and/or calls currently known or hereinafter developed may similarly be used or interchanged in accordance with embodiments presented herein.

Alternative example embodiments can include a web document provided by a server to a client that includes Asynchronous JavaScript and XML (AJAX) to enable data to be sent to and retrieved from the server asynchronously without interfering with the behavior or display of the page displayed on the client device. AJAX can be used to provide a web document to a client that contains the requested data, however, in order for the data to be displayed, the client must make an AJAX request to the server for additional data, such that, without the AJAX request, no data will be provided to the client. In alternative examples, a web document provided to a client may contain transformed elements or obfuscated identifiers and an AJAX request would be required to receive a key from the server, wherein the key can be used to deobfuscate the transformed elements prior to rendering the page for display on a client device. The key, for example, can be a table or list, an encryption/decryption, mapping, function, or other method of controlling or using the transformation methods described herein.

Figure 3A:
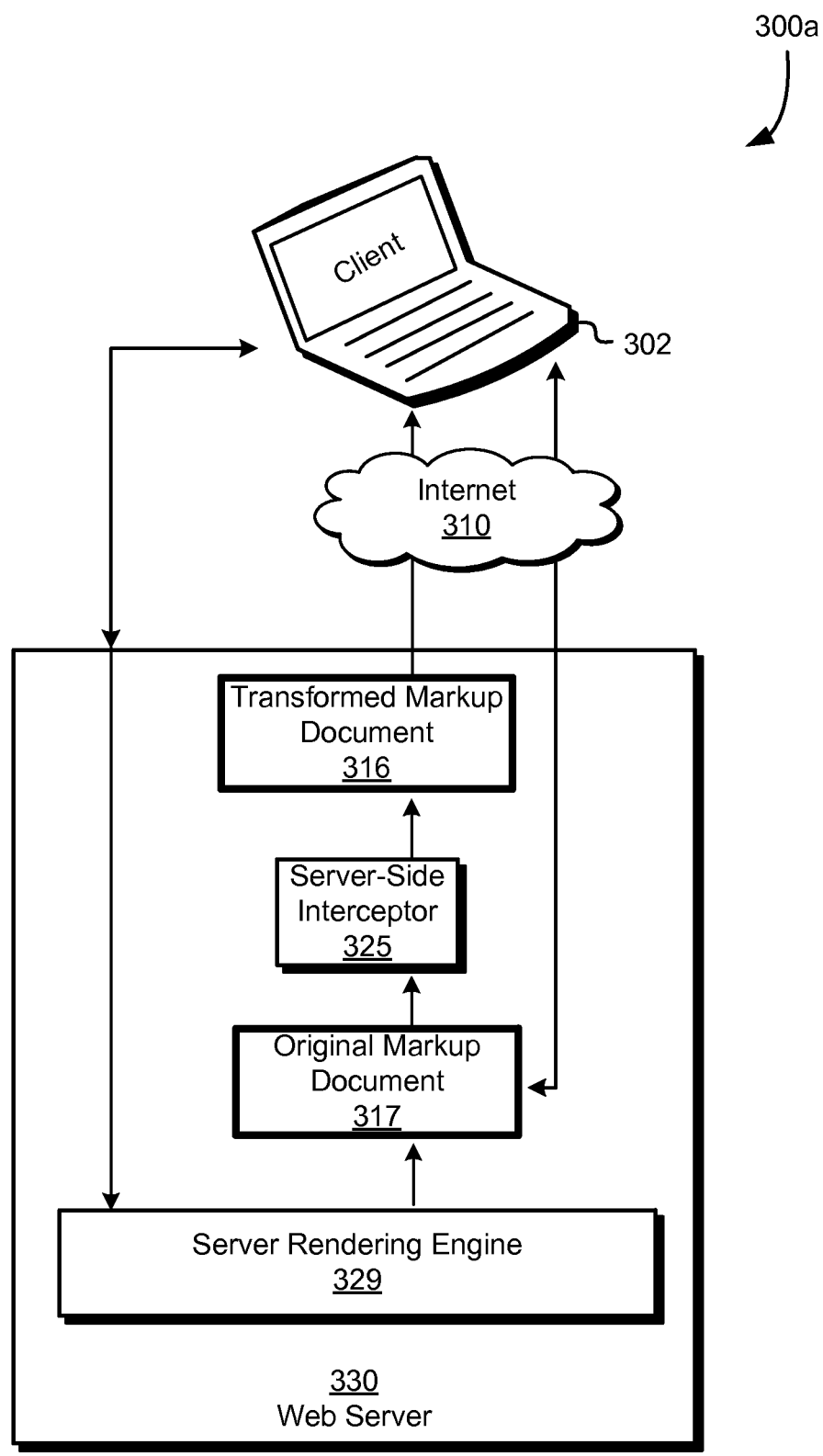
FIG. 3A is an illustrative example of a server-client environment in accordance with at least one embodiment.

FIG. 3A is an illustrative example of an environment 300a in which various embodiments can be implemented. In various embodiments, a client 302, such as a web browser or web crawler, is a software or web application configured to initiate communication with a web server 330 to request a webpage. A client can otherwise initiate or maintain contact with a server for requesting or making use of other network resources such as applications or widgets. The web server 330 can be a computer or network system configured to provide applications or network resources request by the client. For example, the web server 330 can be a server, such as server 125 described in connection with FIG. 1, to host a website. The website can include documents and/or resources available over public or private networks. In some embodiments, the web server 330 and the client 302 can be maintained on the same device, such as a personal computer, mobile device or other device configured to run a server and a client.

In an example embodiment, the client 302 being a web browser running on a user-side device can request a webpage from the web server 330. Upon receipt of the request, the web server 330 can create or configure an original markup document 317, such as an HTML document or other structured document, via a server rendering engine 329 or other module. Upon creating the markup document, the server can respond directly to the client, providing the requested document or the server can provided the created document to a server-side interceptor 325. The server-side interceptor 325 can be a process on a server or a separate process located on a different server or system and accessible by the web server 330.

The web server may configure or create the web document dynamically or statically based at least in part on the specific request or other determinations. For example, the webpage or web document may be delivered as a static document, exactly as it is stored by a web server system. Static webpages provided to a client will provide the content without any transformation. However, in an example embodiment, the server can provide a static document from the server to the interceptor, which can then transform the tags or attributes on the static web document.

In an example embodiment, the server-side interceptor 325 can parse the web document and transform at least one attribute, such as a class name, into a different class name, thereby obfuscating the original class name. The interceptor can provide the document as a transformed markup document 316 with the transformed class name directly to the client 302.

In alternative embodiments, the interceptor can reconfigure the document or provide the transformed web document back to the web server or to another network resource for further processing, transforming and/or rendering. In alternative example embodiments, the server-side interceptor 325 can be configured to determine if the automated-agent is a user to be acted upon differently from other users, whether human users, automated-agents or unknown users. For example, a server or website administrator may want to transform some portions of a web document to unknown or unidentified users, but may want to provide an original or untransformed document to known or self-identified automated-agent.

Figure 3B:
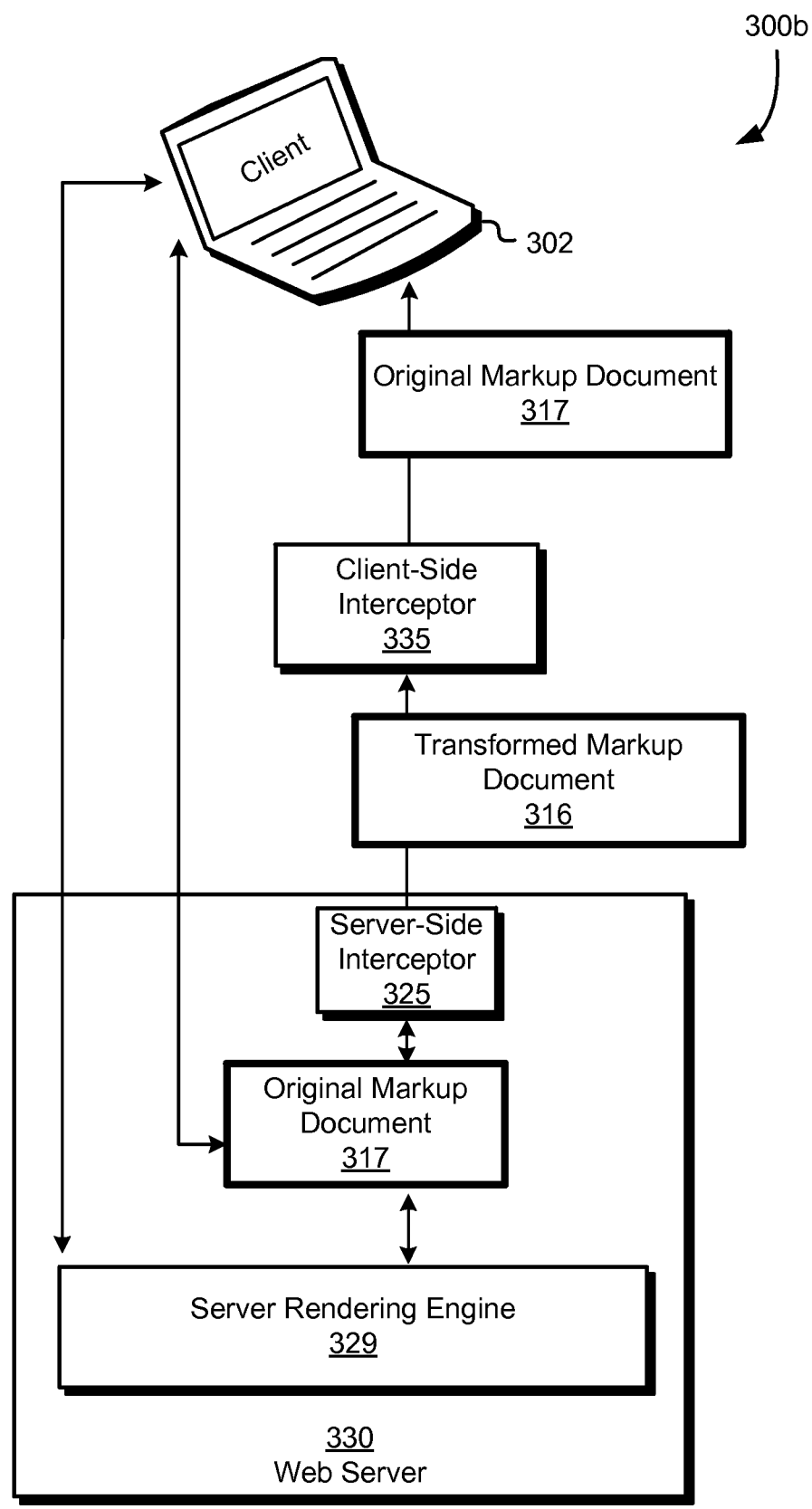
FIG. 3B an illustrative example of a server-client environment in accordance with at least one embodiment.

FIG. 3B is an illustrative example of an environment 300b in which various embodiments can be implemented. In various embodiments, a client 302, such as a web browser or web crawler, is a software or web application configured to initiate communication with a web server 330 to request a webpage. A client can otherwise initiate or maintain contact with a server for requesting or making use of other network resources such as applications or widgets. The web server 330 can be a computer or network system configured to provide applications or network resources request by the client. For example, the web server 330 can be a server, such as server 125 described in connection with FIG. 1, to host a website. The website can include documents and/or resources available over public or private networks. In some embodiments, the web server 330 and the client 302 can be maintained on the same device, such as a personal computer, mobile device or other device configured to run a server and a client.

In an example embodiment, the client 302 being a web browser running on a user-side device can request a webpage from the web server 330. Upon receipt of the request, the web server 330 can create or configure an original markup document 317, such as an HTML document or other structured document, via a server rendering engine 329 or other module. Upon creating the markup document, the server can respond directly to the client, providing the requested document or the server can provided the created document to a server-side interceptor 325. The server-side interceptor 325 can be a process on a server or a separate process located on a different server or system and accessible by the web server 330.

The server-side interceptor 325 can create the transformed markup document 316 and provide the transformed document to a client-side interceptor 335. The client-side interceptor can be configured as a clarifier or de-obfuscator that may be located on or interconnected with a JavaScript® engine, such as the scripting engine 213 described in connection with FIG. 2. In alternative example embodiments, the client-side interceptor 335 can be a scripting engine that is configured to receive a JavaScript® file that will deobfuscate the transformed markup document and allow the requested webpage to be rendered by the client with the un-obfuscated transformed markup document 316 to the original markup document 317 and display correctly on a client device.

Figure 3C:
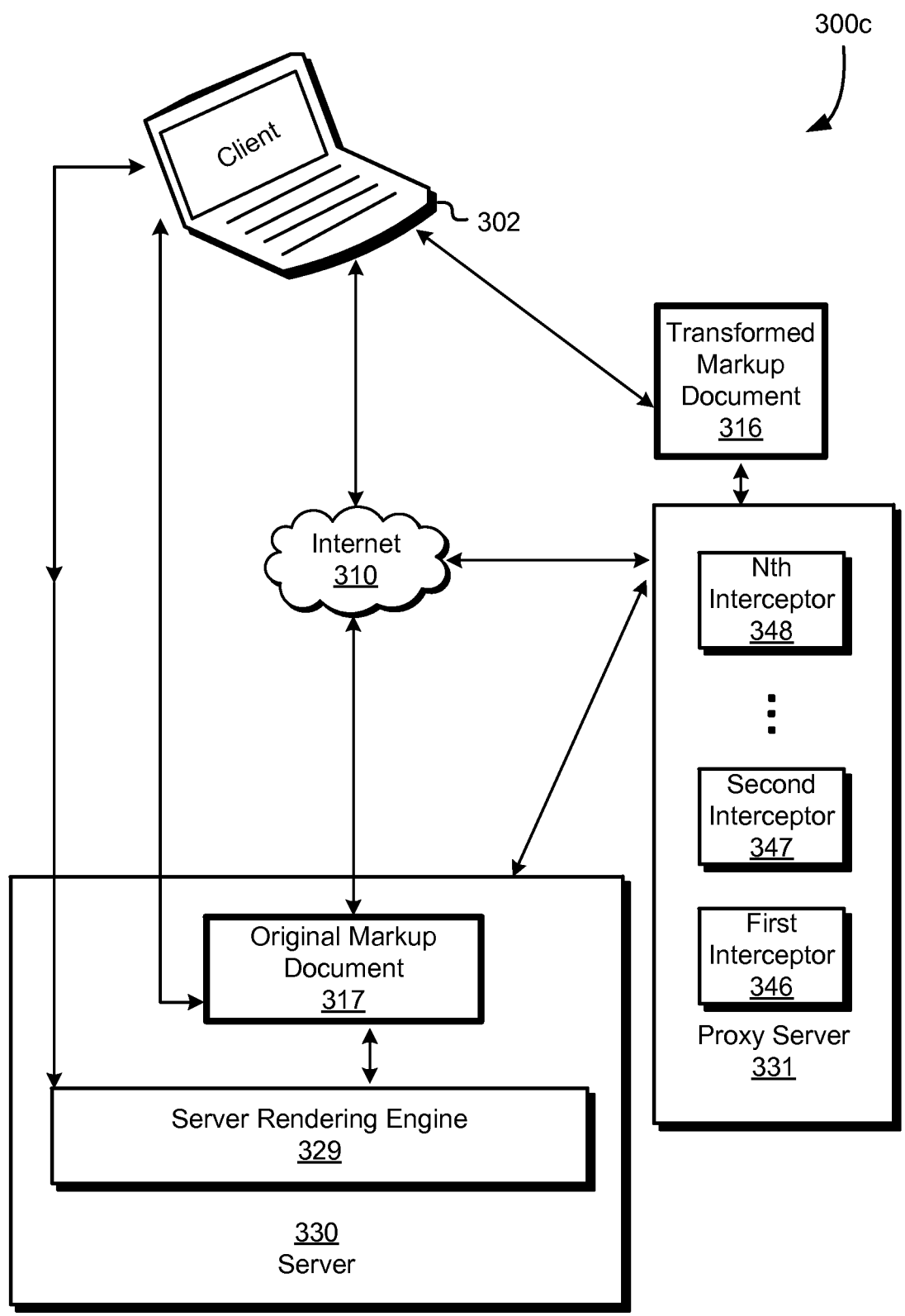
FIG. 3C is an illustrative example of a server-client environment in accordance with at least one embodiment.

FIG. 3C is an illustrative example of an environment 300c in which various embodiments can be implemented. In various embodiments, a client 302, such as a user application running on a client device to initiate communication with a server 330 to request a webpage. A client can otherwise initiate or maintain contact with a server for requesting or making use of other network resources such as applications or widgets. The server 330 can be a computer or network system configured to provide applications or network resources request by the client. For example, the server 330 can be a server, such as server 125 described in connection with FIG. 1, to host a website. The website can include documents and/or resources available over public or private networks.

In an example embodiment, the client 302 being a web browser running on a user-side device can request a webpage from the server 330. Upon receipt of the request, the server 330 can create or configure an original markup document 317, such as an HTML document or other structured document, via a server rendering engine 329 or other module.

The server 330 can be operably interconnected with one or more proxy servers, for example, the proxy server 331 could be a gateway or tunneling proxy, a reverse proxy, forward proxy or other type of proxy. Example embodiments of the proxy server may include one or more interceptors, such as a first interceptor 346, a second interceptor 347 and an Nth interceptor 348. Any one of or all of the interceptors or intermediary inceptors can be used to transform a structured document, widget, application or fraction of an HTML document according to embodiments presented herein. Alternative example embodiments may include the chain of interceptors chaining transformations together to achieve a combinatoric increase in the random variations that can be achieved upon each request from a user, for example, if the order in which the interceptors were applied was varied upon each request.

A transformed document or portion of a document, such as transformed markup document 316 can be created or re-configured according to any method of transformation, see, for example, according to transformation methods illustrated and described in connection with FIG. 4 below. Each of the interceptors can use the same or different transformation methods, for example, the first interceptor can be configured to transform a first element of a markup document by randomizing a class identifier, the second interceptor can be configured to transform the original markup document by adding additional DIV and SPAN elements, and the Nth interceptor can be configured to transform the markup document to contain a key, which can be used to obfuscate a desired element or content of a markup document. The transformed markup document can then be provided to the client.

Figure 3D:
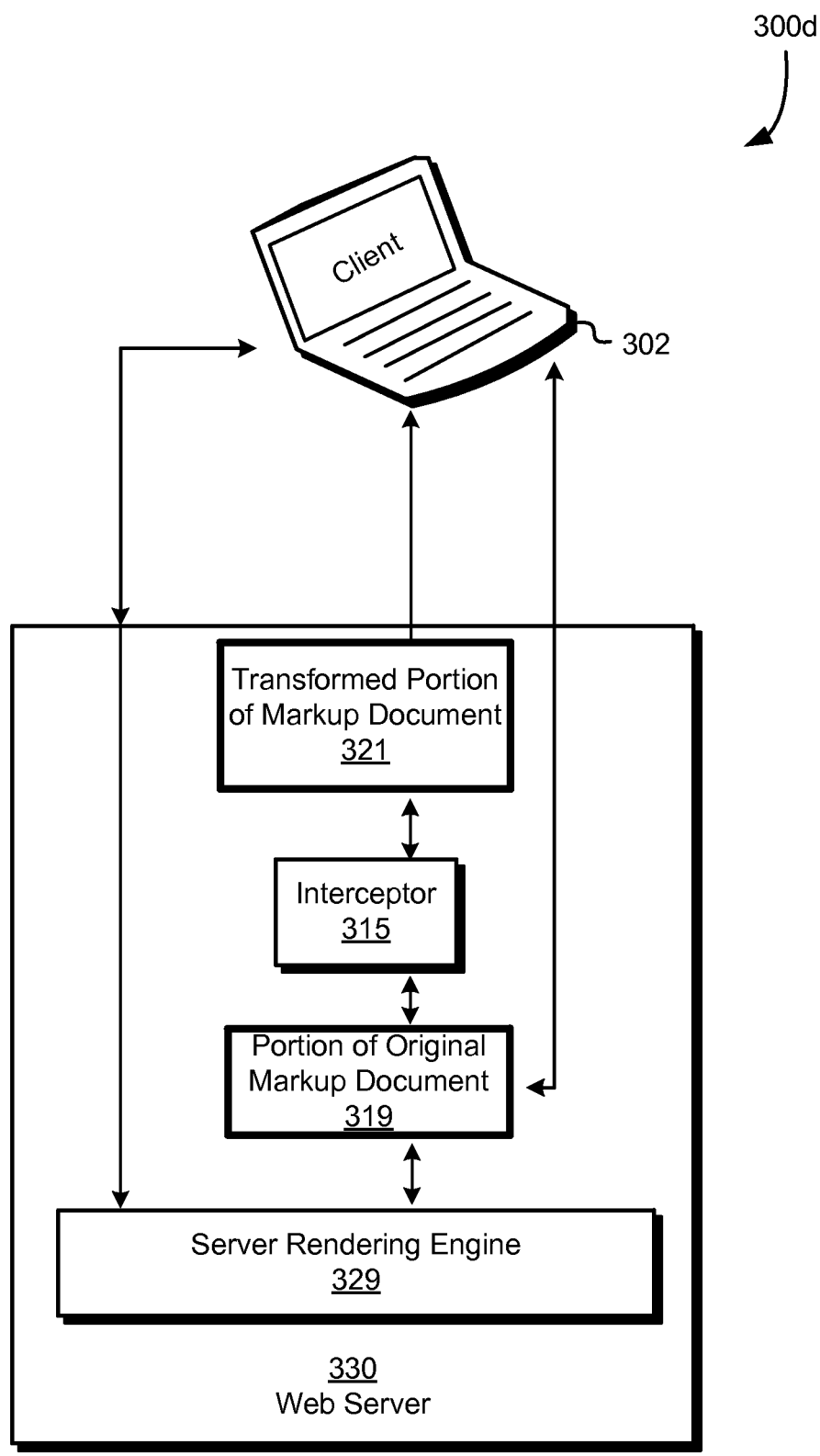
FIG. 3D is an illustrative example of a server-client environment in accordance with at least one embodiment.

FIG. 3D is an illustrative example of an environment 300 in which various embodiments can be implemented. FIG. 3D is similar to FIG. 3A; however, FIG. 3D illustrates a portion of the original markup document 319 is provided to an interceptor for transformation. The interceptor 315 can be a server-side interceptor, a client-side interceptor, a proxy-interceptor or other such component in accordance with methods and systems described herein. The portion of the original markup document can be a widget or a fragment of markup code that is initially a portion of a parent HTML document, or a portion or widget of a different HTML document. The transformed portion of the markup document 321 can be provided directly to the client or incorporated into a parent document or other markup document at any point during or after the transformation.

Alternative example embodiments, other than those illustrated and described in connection with FIGS. 3A-3D, are similarly appropriate in accordance with methods provided herein. For example, a markup document, portion of a markup document, widget, application or other fragment may be used, transformed, randomized or otherwise obfuscated on a proxy server, client-side device, server-side device or other appropriate system.

Figure 4:
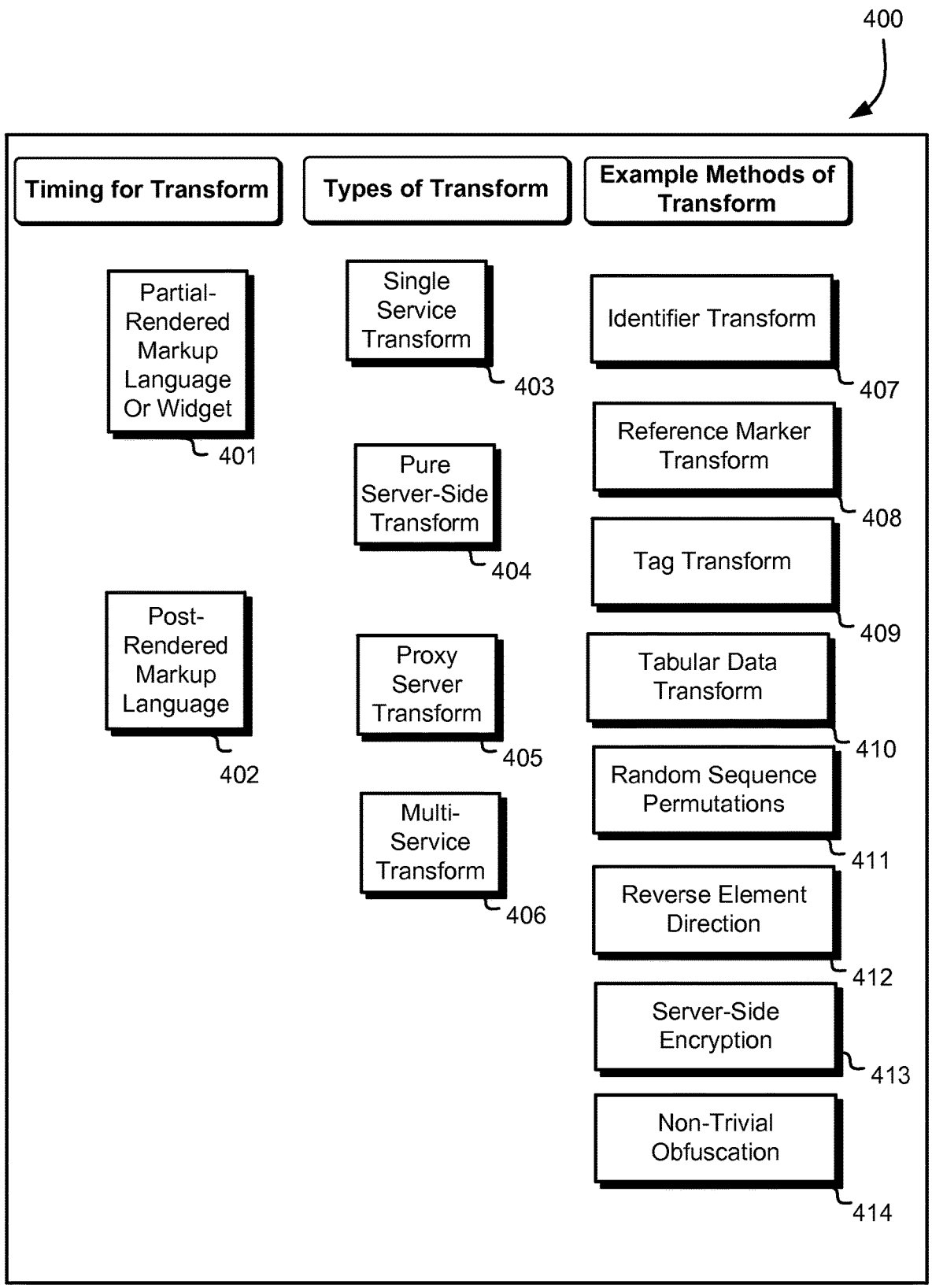
FIG. 4 is an illustrative example of transformation possibilities in accordance with at least one embodiment.

FIG. 4 is an illustrative example of a transformation process 400 in accordance with at least one embodiment. Example embodiments may include multiple methods by which an HTML or web document may be transformed. A server, such as a web server 330 described in connection with FIG. 3, can create a part of a web document (401) and transform the partially-created web document or provide the partially-created document to another server to be transformed. Alternative embodiments can include a web server configured to create a web document completely, and provide the fully-created web document to be transformed in a post-rendered state (402). Alternative example embodiments can include a web document being transformed by a single service (403), such as the interceptor, or at the server-side only (404). A proxy server, such as the proxy server described and illustrated in connection with FIG. 3C, can transform a markup document or portion thereof according to one or more interceptors and one or more obfuscation methods (405). A server can provide the configured or partially-configured document to multiple processors or servers to be transformed in multiple parts or multiple times (406).

Methods of transformation may include, for example, transforming an identifier or element of a document 407, transforming a reference marker 408, transforming a tag 409, using tabular data transforms (e.g., represent data in a table in the markup document or as a list and once the CSS style is applied, the document will render the same) 410, using random sequence permutations 411, reversing text direction (e.g., reconfiguring the text using CSS file) 412, using server-side encryption 413 or using non-trivial obfuscation (e.g., splitting property) 414, or alternative methods of obfuscation markup language.

Alternative example embodiments of transformation may include using data mapping (e.g., an AJAX request that requires a separate request for a JavaScript® script hidden in the web document), allocating variables based on random assignment, using random number generation based on pre-arranged sequences, assigning transformations in a deterministic or nondeterministic manner, randomizing reference markers and mapping the randomized reference marker back to original reference marker, implementing client-side encryption or a combination of server-side/client-side encryption, using a hash function, converting tables to DIV/SPAN markups, changing DIV tags and SPAN tags using a style sheet file to maintain consistent behavior, randomizing tag identifiers and/or classes, using a key or using alternative obfuscation methods currently known or hereinafter developed for use in accordance with example embodiments presented herein.

In example embodiments, one or more elements of a structured document may be added that have no discernable effect on the visual representation of the rendered webpage, but will otherwise change the structure of the document. For example, DIV, SPAN or other HTML elements may be added or hidden in an HTML document, which, when configured with a style sheet (e.g., CSS file) will render the webpage in the same manner as an unobfuscated document would render. For example, by way of CSS, a DIV may be modified to have the same visual appearance as a SPAN, a SPAN element may be replaced with a P element or a SPAN-based layout may be replaced with a table-based layout, etc. Other methods to change the structure of the document may be added, for example, table rows, columns and/or cells may be added or images may be made transparent in an effort to confuse an automated-agent as to the location of the data attempted at being scraped.

In example embodiments, a server, interceptor or alternative transform device does not necessarily transform the entire markup document. One or more transform methods may be implemented on any part of an element, tag, attribute or part thereof of the markup document and may transform the desired portion of the document without transforming the entire document. For example, a user request may be for a document where at least one portion of an element is desired to be obfuscated from an automated-agent. The entire document, including the one portion of a web document, may be obfuscated, or a single variable or tag containing the content may be obfuscated according to any one of the currently known or hereinafter developed methods of obfuscating document markup.

Alternative example embodiments include a server configured to use a DIV tag or a SPAN tag arbitrarily to serve a markup document in response to a client request. An obfuscator, such as the interceptor 315 described in connection with FIG. 3D, can be configured to switch a DIV tag or a SPAN tag arbitrarily such that the CSS file accompanying the markup document or stored in a browser's cache, includes specifications for presenting all DIV tags and all SPAN tags equally when displaying the webpage on a user device. Alternative example embodiments may include a JavaScript® script to specify that the HTML document should be reconfigured to switch a SPAN tag with a DIV tag before rendering the webpage for display on a user device.

Example embodiments may include chaining transformations, such as any two or more of transformations 407-414, together to achieve a combinatoric increase in the random variations that can be achieved on a page or document. A combination chain may be used in any order and may be used in different orders for each request; for example, in response to a first request, the markup can to be transformed by chaining transformations 407, 409 and 411 and in response to a next request, the markup can be transformed by chaining transformations 408, 410 and 412. Alternative example embodiments may include chaining different types of randomizations.

In other bots, the automated-agent may be written to divide webpages in to multiple portions in order to download only a part of the webpage at a given time. In such a case, the markup document may be configured and transformed in response to each request received, so, even if only a portion of a webpage is requested, the elements desired to be obscured for the entire webpage, can be obfuscated in piece-meal fashion.

Figure 5:
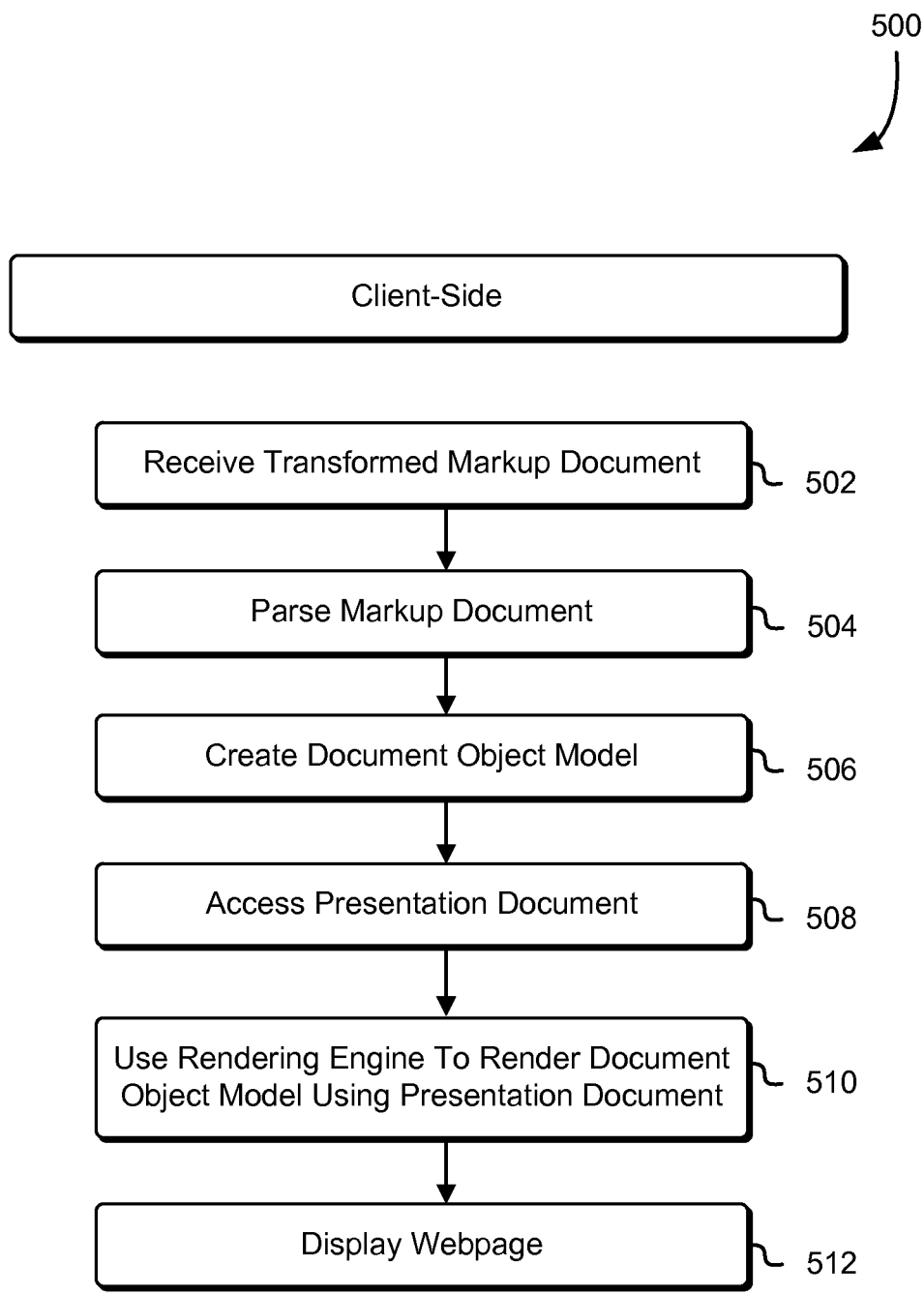
FIG. 5 is an illustrative example of a process for rendering a webpage for display based on a transformed document in accordance with at least one embodiment.

FIG. 5 is an illustrative example of a process 500 for rendering a webpage in accordance with at least one embodiment. The process 500 may be performed by any suitable system, such as by the client 102 described above in connection with FIG. 1 and/or an appropriate component of a system associated therewith, such as by a service operating to provide the connection and interface with a user device. Returning to FIG. 5, an embodiment of the process 500 includes a server receiving a transformed markup document (502) from a source, such as a web server or application. The transformed markup document may include an entire web document or portion thereof that has been transformed in a manner that obfuscates some or all elements of the document. Web document attributes, such as an identifier or a class can be modified, changed and/or mapped in a manner that would maintain the original attribute, but effectively hiding the attribute by mapping it to the transformed attribute or using a key.

Returning to the process 500, a client, such as a web browser, may parse the transformed markup document (504) to determine if any images, scripts, styles or the like need to be downloaded and/or parsed. While the document is being parsed, the client creates a Document Object Model (DOM) (506) or the like. As the process 500 continues, the client accesses a presentation document (508), such as a Cascading Style Sheet (CSS) file, used to render the webpage according to a specified presentation schema. The client, via a rendering engine or other process or processor, uses the DOM and CSS file to render the webpage (510) to be displayed on a user device. Example embodiments could include the rendering engine reconfiguring any transformed portion of the original markup document such that the displayed webpage included the requested content. Returning to the process 500, the client displays the webpage (512) based on the web document. The client may render additional webpages or documents in accordance with the same response from the web server or additional responses to new requests in the same or similar manner as the first rendering.

The CSS specifications describe/provide instructions as to how elements of a web document are to be displayed by a browser. CSS, or other style sheet languages, is used to provide information in a CSS file to reconfigure or decode the obfuscated attributes, tags or the like in the HTML document. For example, a server can serve an HTML document in response to a request for content from a client. The server, or system operably interconnected with the server, can transform an element or portion of an element from the HTML document and provide presentation instructions in a corresponding CSS file for use by a web browser in rendering the webpage to display the original contents based on the portion of the element as it was before it was transformed.

Figure 6A:
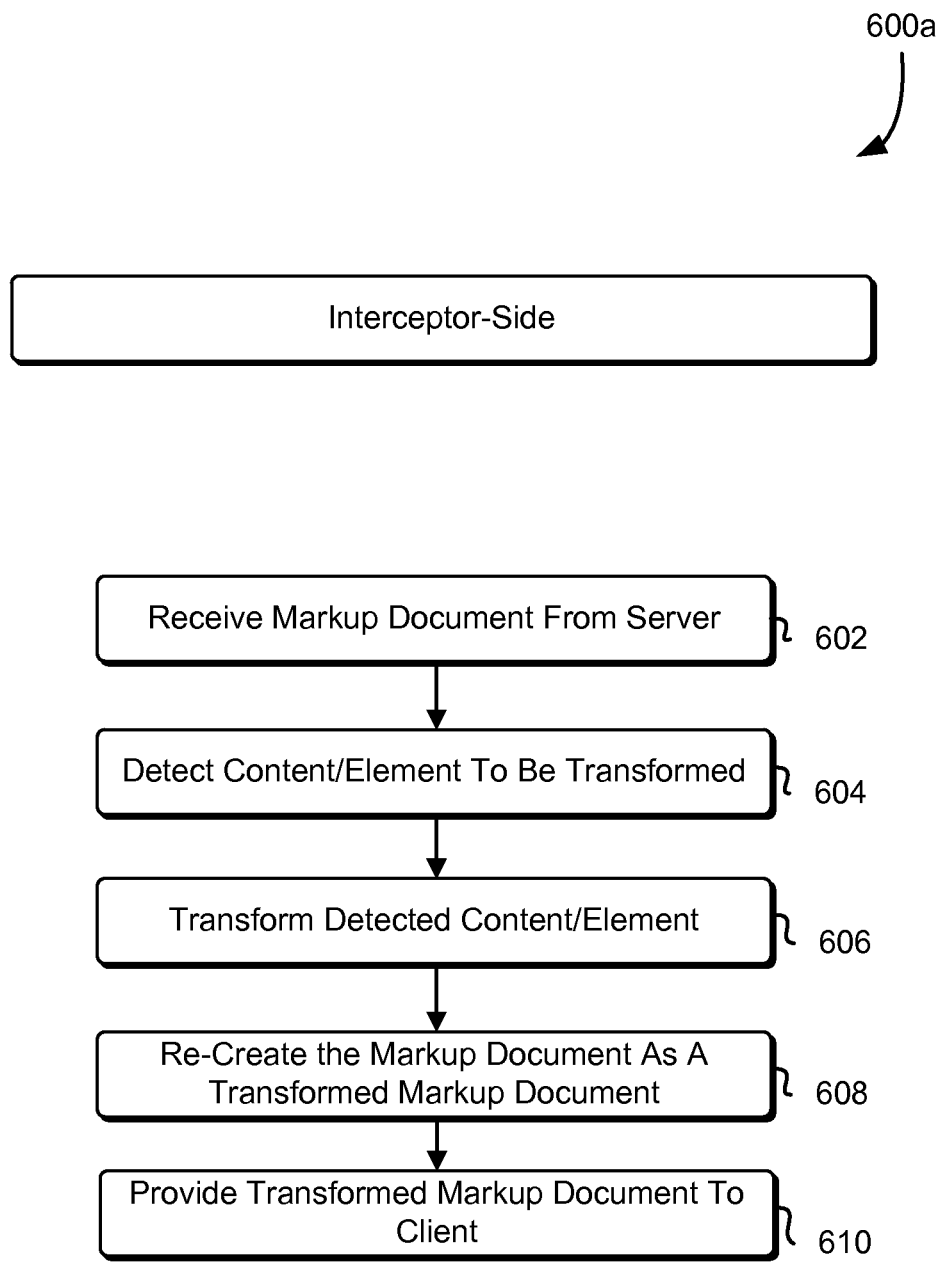
FIG. 6A is an illustrative example of a process for transforming elements or reference markers of a web document in accordance with at least one embodiment.

FIG. 6A is an illustrative example of a process 600*a* for transforming content in a structured markup document in accordance with at least one embodiment. The process 600*a* may be performed by any suitable system, such as a processor such as the interceptor 315 as described in connection with FIG. 3A and/or any appropriate component thereof. Returning to FIG. 6A, an interceptor receives a markup document from a server (602). Alternative example embodiments may receive multiple documents, such as an HTML document, CSS file, other structured markup documents or portions of a single markup document to be rendered. According to the process 600*a*, the interceptor detects an element or content of the markup document to be transformed (604). The interceptor can be configured to detect any portion of a markup document, for example, the interceptor may detect an element class or element identifier. The interceptor, or a process operably interconnected with the interceptor, transforms the detected element or reference marker (606) and re-configures the structured markup document as a transformed structured markup document (608). According the process 600*a*, the interceptor provides the transformed markup document to the client for further processing (610).

Example embodiments may include transforming HTML elements in real-time or near real-time based on requirements of a website administrator. For example, a user may request a webpage on an e-commerce website that includes new sports equipment. If the new equipment has just been placed on sale, the interceptor can be configured to transform elements providing details of the sale automatically in real-time. Such as, all price and shipping data identifiers will be obfuscated during the sale period.

Alternative example embodiments may include dynamic obfuscation based on related or corresponding information. For example, if the sports equipment requested is on sale and the user is at a check-out page, if the user has more than two of the sale items in their e-shopping cart, the interceptor can obfuscate any or all elements identifying shipping and tax data, for example.

Alternative embodiments may include obfuscating or randomizing more element identifiers based on the location on a website. For example, if a user has entered a valid username and password or successfully solved a CAPTCHA, the interceptor can obfuscate fewer elements in the web document. However, if the user is on a general or unprotected page of the website, the interceptor can dynamically determine or be configured to randomize more elements of a web document.

In an example embodiment, the interceptor can include chaining multiple transformations together to increase the complexity of the obfuscated reference marker. For example, a rendered web document provided to the interceptor could be transformed a first time by transforming a class name. The interceptor could run a second transformation on the document, transforming some or all DIV tags to SPAN tags, and then run a third transformation on the document, transforming an identifier. The more difficult transformations can be more destructive to an automated-agent attempting to parse the web document.

Figure 6B:
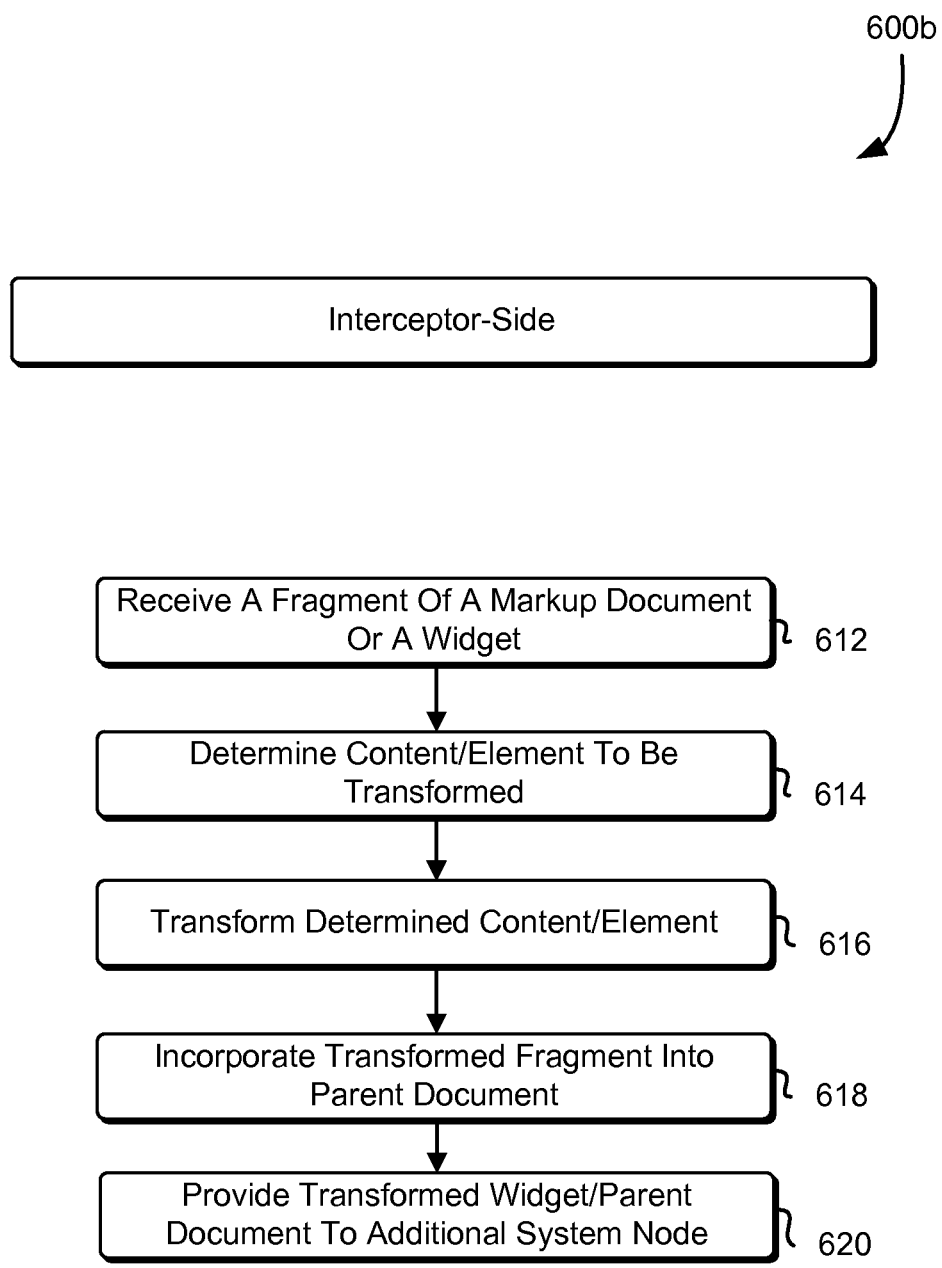
FIG. 6B is an illustrative example of a process for transforming a widget in accordance with at least one embodiment.

FIG. 6B is an illustrative example of a process 600*b* for transforming content in a structured markup document in accordance with at least one embodiment. The process 600*b* may be performed by any suitable system, such as a processor such as the interceptors 346, 347, or 348 as described in connection with FIG. 3C and/or any appropriate component thereof. Returning to FIG. 6B, an interceptor receives a widget or fraction of a markup document (612). Alternative example embodiments may receive multiple widgets or applications. According to the process 600*b*, the interceptor determines an element or content of the widget to be transformed (614). The interceptor can be configured to detect any portion of a markup document, for example, the interceptor may detect an element class or element identifier. The interceptor, or a process operably interconnected with the interceptor, transforms the determined element or reference marker and re-creates or configures the widget as a transformed widget (616). According the process 600*b*, the interceptor provides the widget to be incorporated into one or more parent documents, such as structured document (618) and provides the transformed widget or entire parent document to an additional node of the system, for example, to any of a second interceptor, additional server or the client.

Figure 7A:
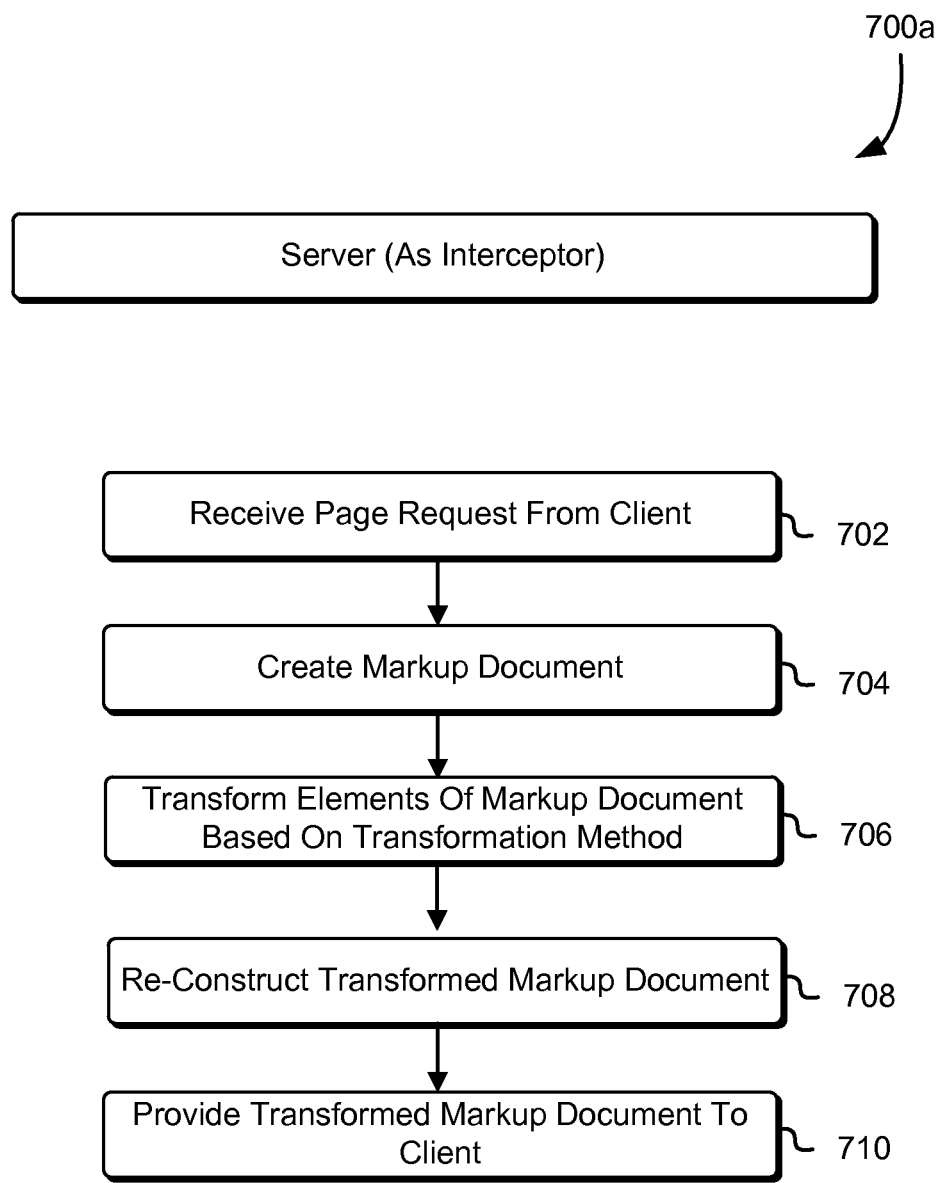
FIG. 7A is an illustrative example of a process for creating markup documents and transforming markup in accordance with at least one embodiment.

FIG. 7A is an illustrative example of a process 700*a* for configuring a markup document and transforming at least a portion of the document to obfuscate elements therein in accordance with at least one embodiment. The process 700*a* may be performed by any suitable system, such as by a web server 230 as described in connection with FIG. 2 and/or any appropriate component thereof.

Returning to FIG. 7A, the process 700*a* continues by receiving, at a server, a request for a webpage from a client (702). The process 700*a* continues by configuring, at the server, the markup document (704) in response to the received request. In alternative example embodiments, the server could configure a portion of an element of the HTML document or specified attributes of the HTML document. Returning to the process 700*a*, the server is configured to transform elements of the markup document based on a transformation method (706). The transformation method can include randomizing the markup, such as randomizing reference markers and mapping the randomized reference markers to the original reference markers. The process 700*a* continues, at the server, by re-configuring the transformed markup document (708). Alternative example embodiments can include the server transforming an attribute of the markup document inline without configuring the document for a second time. The process 700*a* continues by providing, from the server, the transformed markup document to a client (710).

Example embodiments further include determining a transform based on a session identifier (ID) on a deterministic basis. For example, each transformed markup document can get one of several, potentially one of millions, of CSS files per each session. In the example embodiment, the server is configured to select a transform based on preexisting transforms with a corresponding CSS file(s). The transform could be created on a per-session ID basis (as opposed to a per-request ID basis). Alternative bases for determining a time or mechanism to transform a document or component thereof are similarly applicable according to embodiments presented herein. This will allow for faster rendering for display to a customer, as a client can maintain transformation information stored in the browser's cache, and would thus save resources and time when handling a transformed document. An automated-agent, not maintaining a session ID, will receive a randomized document based on a per-request ID basis and will require expending additional cost and resources to parse and render the transformed HTML document upon each request. If an automated-agent is using a cookie to maintain a session-ID, the bot is detectable and the server administrator can choose to block the detected bot completely or partially or to continue to provide the detected bot with randomized markup.

Alternative example embodiments may include a server or interceptor configured to transform an element class or identifier according to a non-deterministic pattern. For example, the server can transform and/or configure an HTML document according to a randomization process or sequence of random variables that describe a method with a result that does not follow a deterministic pattern. For example, nondeterministic randomization can be implemented where multiple transformations are available, a predetermined number of types of changes are available. For example, if ten transformative options exist, and each would obfuscate the elements in a different manner, but render the output in the same manner, a nondeterministic function can be used to choose from any one of the ten methods without effecting the end result.

In alternative examples, a web document containing an identifier for a price can be mapped to one of twenty randomized identifiers. A nondeterministic function can be used to transform the price identifier to any one of the twenty randomized identifiers without the need for maintaining a key. Such that, when a client receives a transformed web document in which the nondeterministic function was used, the client, when parsing a corresponding CSS file or the like, is configured to deobfuscate the identifier in a first manner if the identifier is one of the first ten randomized identifiers and deobfuscate the identifier in a second manner if it is one of the second ten randomized identifiers.

Figure 7B:
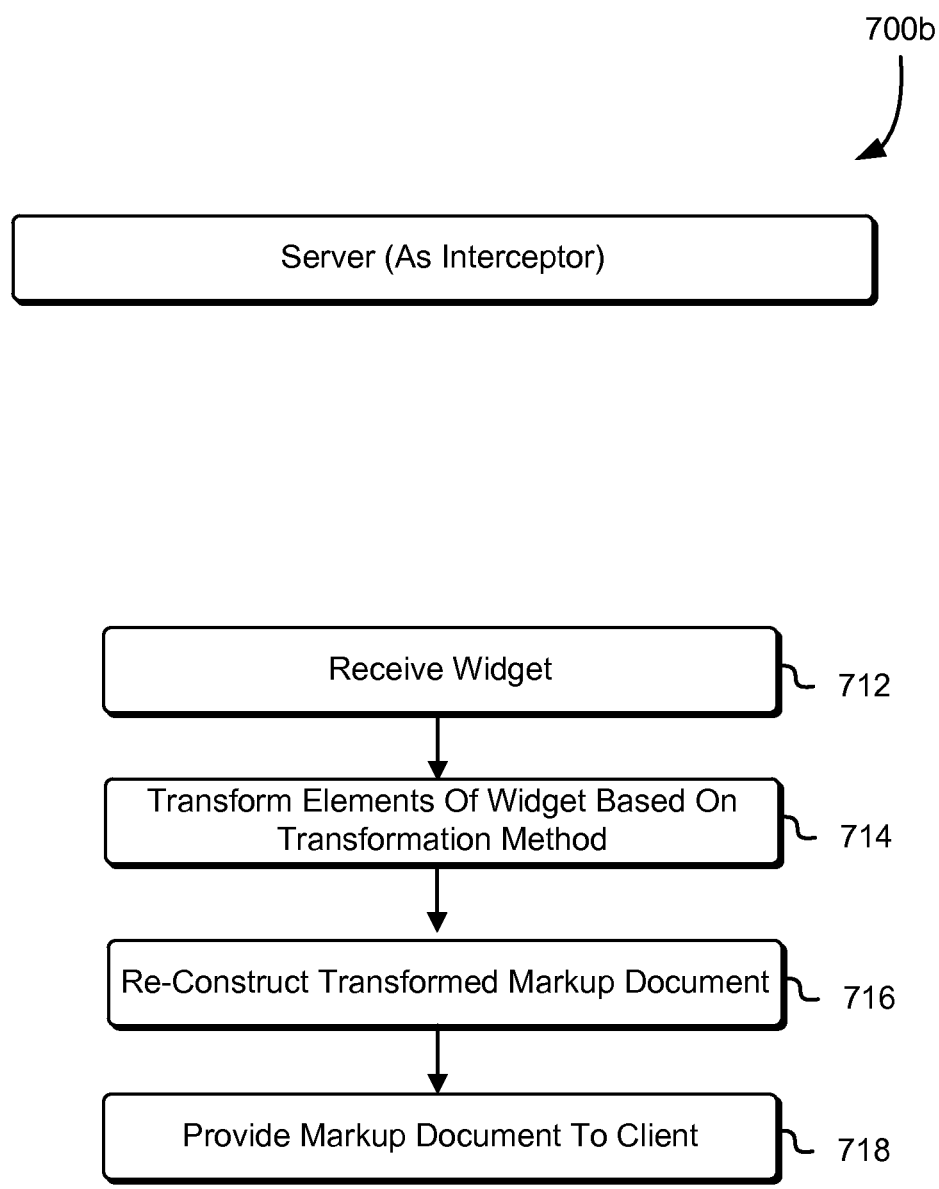
FIG. 7B is an illustrative example of a process for configuring a widget and transforming markup of the widget in accordance with at least one embodiment.

FIG. 7B is an illustrative example of a process 700*b* for creating a markup document and transforming at least a portion of the document to obfuscate elements therein in accordance with at least one embodiment. The process 700*b* may be performed by any suitable system, such as by a web server 230 as described in connection with FIG. 2 and/or any appropriate component thereof. Returning to FIG. 7B the process 700*b* continues by receiving a widget (712) at a server or interceptor and transforming elements of the widget (714) according to a transformation method, such as one or more of the transformation methods described and illustrated in connection with FIG. 4. The process 700*b* continues by re-constructing a markup document with the transformed widget (716) and providing the document to a client (718).

Alternative example embodiments of the process 700b may include a server serving a portion of the markup document and transforming a portion of that portion of the markup document. Further example embodiments include at least two servers, or systems thereof, serving a markup document in multiple parts to provide to the same client.

Alternative examples may include the process 700b being performed by a server-side browser component of a split-browser, such as the SILK® browser, with separate client-side and server-side components. For example, a server-side component can be configured to retrieve requested content (e.g., webpages or widgets) on behalf of a client, and perform a portion of the rendering or other processing that a browser is typically configured to perform, upon receiving such content (e.g., parsing an HTML file, retrieving embedded resources, etc.). The processing results are provided to the client-side browser, which can be configured to perform other rendering and/or processing tasks in order to execute and display the content or network resource fully (e.g., any remaining parsing of an HTML file, executing JavaScript®, etc.).

Figure 8:
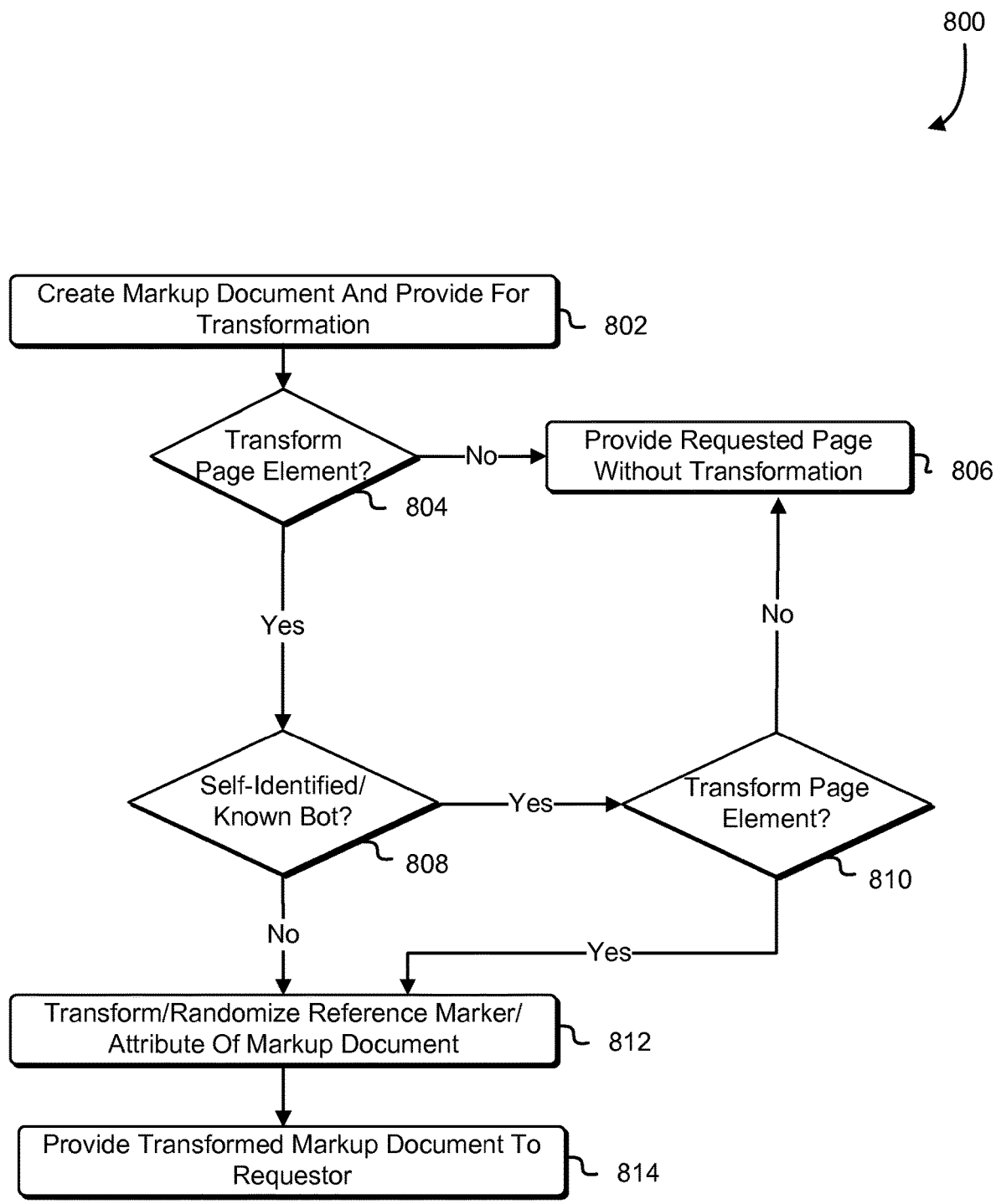
FIG. 8 is an illustrative example of a process for configuring transformed documents in a manner for self-identified automated-agents in accordance with at least one embodiment.

FIG. 8 is an illustrative example of a process 800 for creating a markup document based, at least in part, on the presence of a known or self-identified automated-agent in accordance with at least one embodiment. The process 800 may be performed by any suitable system, such as by a web server 230 as described in connection with FIG. 2 and/or any appropriate component thereof.

Returning to FIG. 8, the process 800 includes a server creating or configuring a markup document and providing the document for transformation (802). The server is configured to determine if an attribute or portion of the web document is desired to be obfuscated (804). For example, a server, such as the server 330 or interceptor such as interceptor 346 described in connection with FIG. 3C can be configured to access a database of attributes, one or more of which is designed to be transformed. If the server determines no attribute or other reference marker should be transformed, then the server is configured to provide the document to the client in its original form (806). In alternative example embodiments, if the server determines that an attribute or reference marker of the web document should be transformed, the server is configured to create a markup document including the requested page content and provide the document to be transformed.

The process 800 continues, an interceptor, server or other system component is configured to determine if the requestor is a self-identified automated-agent or a known automated-agent (808). For example, the interceptor can be configured to maintain a list of known bots or be configured to access a database of trusted automated-agents. As the process 800 continues, if the interceptor determines the self-identified or known bot is the requestor, the interceptor or other processor determines to transform an element, tag, attribute or reference marker of the web document (810). For example, if a known bot is present, and the server or website administrator or other controller wants to provide unobfuscated or original markup documents to the known bot, then the interceptor would not transform the document and would provide the requested document to the requestor. Alternatively, if the self-identified or known bot is detected and the server administrator desires to obfuscate some portion of the web document, the interceptor is configured to transform or randomize a reference marker, attribute or the like of the web document (812) and provide the transformed markup document to the requestor (814).

For example, automated-agents typically identify themselves in a request to a server. This self-identification allows a server or website administrator to contact the owner, block specific bots, log incoming requests, allow specific bots and know/learn additional information related to the automated-agent, its purpose and procedures.

Example embodiments may enable an administrator to allow certain general-purpose web crawlers expressly to access the webpage in original form without obfuscating any or all elements or portions of elements. For example, a website may want to allow YAHOO!®, MICROSOFT® and GOOGLE® full, unobstructed and/or unrestricted access to the data. In such a circumstance, the website administrator may expressly allow identified bots YAHOO! SLURP®, BINGBOT® and GOOGLEBOT®. In alternative example embodiments, a server or process may log information about unidentified, known bots over a period. The server may then be configured to allow or block these bots on a dynamic basis. For example, a server may block a known bot during a certain period, obfuscate some reference markers of a web document during a different period and allow an automated-agent to download an unobfuscated web document during a different period.

In situations where an identifier of the client has been recorded as an automated-agent, when the client sends a request to the server, the server can respond in multiple ways, one of which includes HyperText Transfer Protocol (HTTP) server code, such as a redirect code, to direct the client to another resource or website such as an application programming interface (API). In certain situations, a website host or administrator may want to allow automated-agents to collect data. For example, GOOGLEBOT® may review metadata, content, and other information on a webpage in order to index the data.

Example embodiments may allow for monitoring the type of traffic accessing the webpage and search for known and/or identified bots. When a known/identified bot is detected, a decision to obfuscate information or provide the un-obfuscated data may be made. The decision may be made in real-time or near real-time and the bot monitoring may be turned on and off at the election of the administrator or for other reasons. Alternative examples allow for monitoring the Uniform Resource Locator (URL) from where the traffic arrived in order to determine if the traffic was originating or coming from a human user or an automated-agent, or the likelihood of which.

A website may include code capable of detecting the type or version of the web browser. For example, some automated-agents will cloak their identification, rather than identifying themselves in a request, in an attempt to gain access to content the server would otherwise obfuscate. Example embodiments of a server may receive a request from a bot that is cloaked or spoofed to appear as a trustworthy or known browser. In response, a server may obfuscate elements or markers of the markup document in such a way that will be tolerated by the true browser type or version, but would fail to render correctly for a less fault-tolerant client. Alternative example embodiments may include obfuscating attributes of a markup document based on a type or version of a client. For example, returning markup handled by fault-tolerant browsers but fails when parsed by basic HTML or XPath libraries used by some automated-agents.

Figure 9:
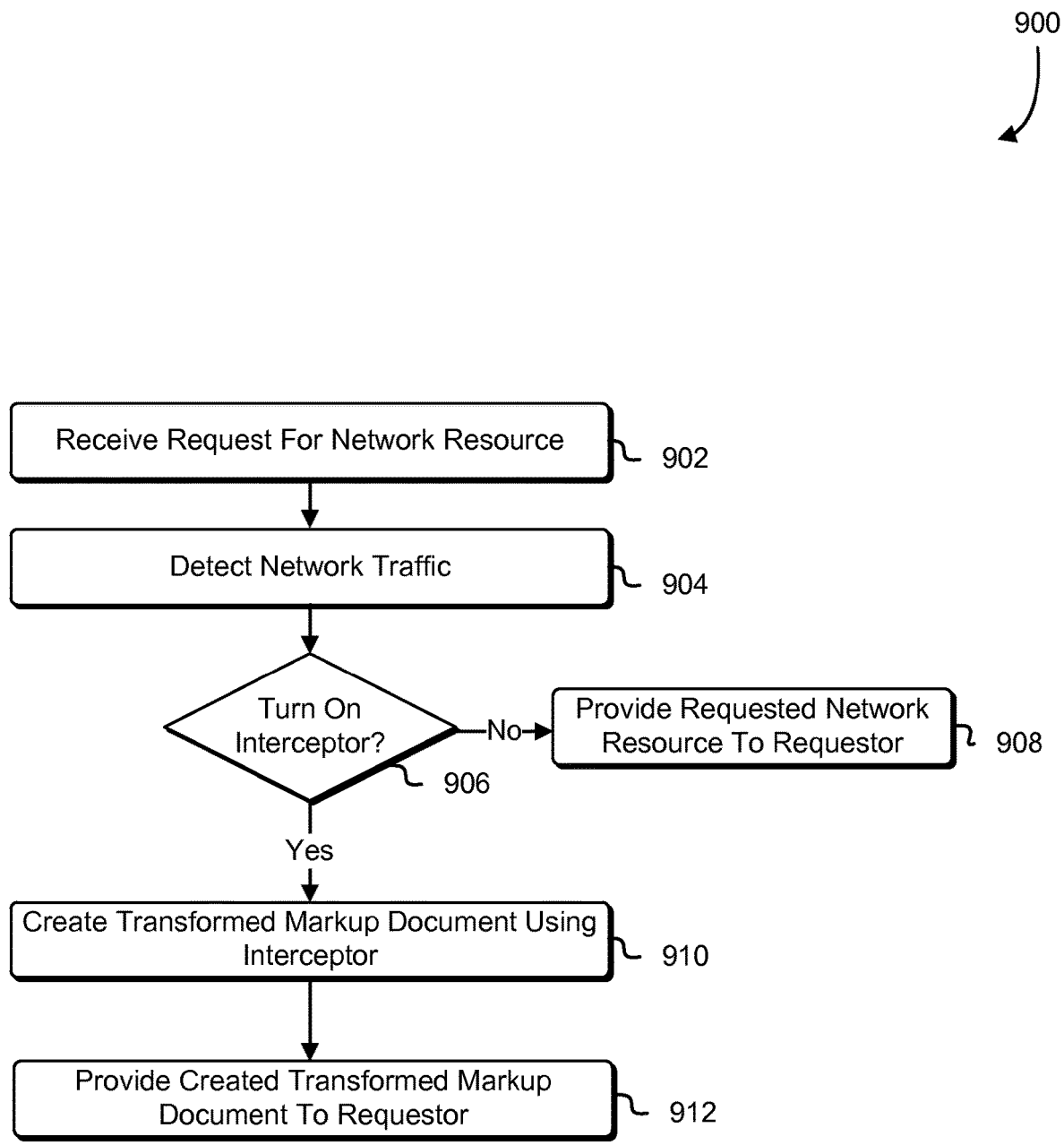
FIG. 9 is an illustrative example of a process for monitoring traffic and transforming elements based on traffic data in accordance with at least one embodiment.

FIG. 9 is an illustrative example of a process 900 for determining to obfuscate a web document or elements therein in accordance with at least one embodiment. The process 900 may be performed by any suitable system, such as by the web server 330 as described in connection with FIG. 3D and/or appropriate component thereof.

Returning to FIG. 9, according to the process 900, a server receives a request for a network resource (902). The server detects network traffic (904) and based, at least in part, on the detection, determines whether to enable an interceptor (906) such as the interceptor 315 described in connection with FIG. 3D. As the process 900 continues, if it is determined that the interceptor should not interact with the web document, then the server provides the document to the client in its original untransformed form (908). If it determined that the interceptor should interact with the web document, then the server provides the document to the interceptor, and the interceptor configures the transformed markup document (910). According to the process 900, the server then provides the transformed markup document to the requestor (912).

In alternative example embodiments, an interceptor can be configured to monitor network traffic for potential traffic growth, surges, rates and the like. The interceptor can be further configured to monitor current traffic data, maintain or access historic traffic data and compare the current and historic data in order to adjust a level or degree of transformation on a dynamic basis. The interceptor can be configured to change configurations automatically on a widget level to compensate for traffic changes at specific portions or applications running on a webpage. The interceptor can be configured to receive traffic information from an external traffic monitor and/or be integrated with a server to monitor the traffic information as well. The traffic information may be monitored in real-time or near real-time. In alternative example embodiments, the server can be configured to disable the interceptor when the traffic data suggests that no bot traffic is present and enable the interceptor when bot traffic, or possible bot traffic, is again detected.

In some example embodiments, instead of a known bot, there may be a known human user. Known users may be able to bypass the obfuscation or transformation elements. For example, a specific user may be a permitted user, such as a well-known user, frequent user, or user of a certain status of the website being accessed. In one embodiment, the user may enter data that includes user information corresponding to known users or accepted users, in such embodiments, the markup document provided by the server will not be obfuscated. For example, user data may be entered to facilitate authentication of the user as a trusted user, such as use of a username, password, public key encryption method or other security protocol. Such user data may also indicate privileges associated with that user that will enable the user to receive unobfuscated markup.

In example embodiments, the changes made to obfuscate markup documents are done in a manner that does not alter or affect the visual appearance of the webpage as it is displayed on a client device. In some such embodiments, the obfuscation methods can be disabled for systems that use screen reader software that may require the document structure to be applied in a specific manner or a predictable structure. Example embodiments can transform an entire markup document or a component or fraction of a markup document, such as a widget or application. In alternative embodiments, transformation methods may be applied to obfuscate or alter form elements of a markup document to inhibit the use of automated form submissions. For example, if an automated-agent submits a form using a token or spoofed session identifier, the form submission may be rejected if the form element is obfuscated for a certain period. Example embodiments may be configured to transform a document or portion of a document according to a specific pattern; for example, all markup documents will be transformed when the requested page includes information on new products. The transformation can be applied to different documents or different elements of documents upon each request to help load balancing, benefit data caching, discourage repeated automated-agent attacks or other reasons.

Figure 10:
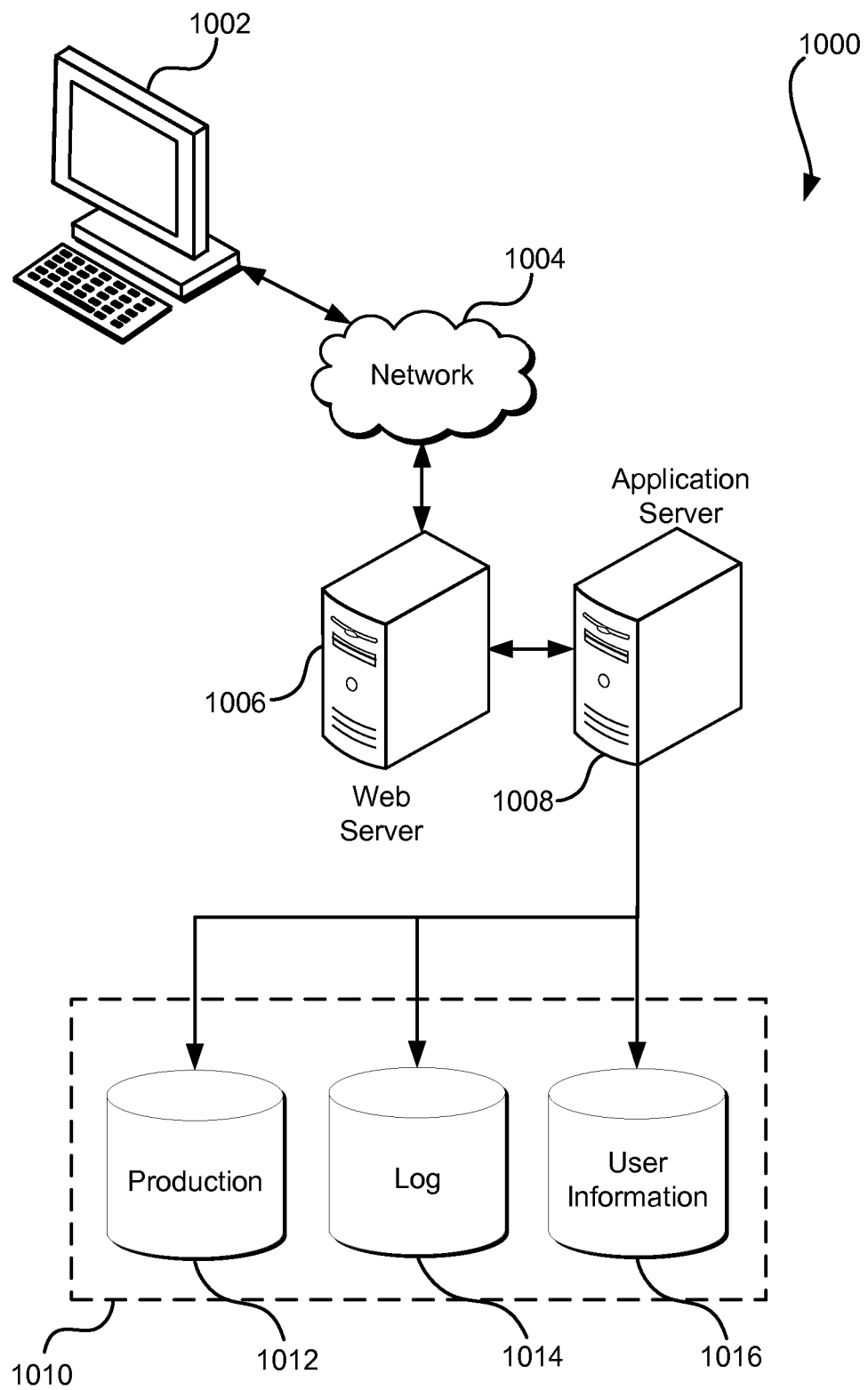
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a webpage that the user is able to view via a browser on the user device 1002. Information for a particular item of interest can be viewed in a dedicated page or window of the browser. It should be noted, however, that embodiments of the present disclosure are not necessarily limited to the context of webpages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for obfuscating at least one element of a webpage, comprising:
    receiving, from a client device, a request for the webpage;
    as a result of receiving the request, configuring a structured document to display information, wherein the structured document includes the at least one element that serves as an indicator of a type of the information to be displayed in accordance with the structured document by the client device;
    transforming the at least one element with at least one second element;
    modifying a presentation document with transformation information of the at least one element and the at least one second element;
    reconfiguring the structured document such that the at least one element of the structured document is transformed in a manner configured to cause the client device to use the transformation information to display the information in the same manner as if the at least one element was untransformed, wherein the structured document and the reconfigured structured document in combination with the presentation document have the same visual appearance; and
    providing the reconfigured structured document and the presentation document to the client in response to the request for the webpage.

2. The computer-implemented method of claim 1, wherein the structured document includes at least one third element, the computer implemented method further comprising:
    transforming the at least one third element with at least one fourth element and
    modifying the presentation document with second transformation information of the at least one third element and the at least one fourth element.

3. The computer-implemented method of claim 1, further comprising determining whether to transform the at least one element of the structured document based at least in part on an identification of the at least one element in a database of elements as a type of element to be obfuscated.

4. The computer-implemented method of claim 3, wherein content of the at least one element corresponds to price data, inventory data, user review, shipping location data, storage location data, shipping cost data, shipping estimate data, tax cost data, item description data, sale data, images, image data, order history data, user recommendation data, or system recommendation data.

5. The computer-implemented method of claim 1, wherein transforming the at least one element with the at least one second element includes determining whether to transform the at least one element according to a deterministic function or a nondeterministic function.

6. The computer-implemented method of claim 1, wherein transforming the at least one element includes transforming the at least one element using different reference tags, different identifiers, tabular data transform, a random sequence permutation, a reverse variable transform, server-side encryption, client-side encryption, combination client-side/server-side encryption or non-trivial obfuscation.

7. A system, comprising:
    at least one computing device configured to implement one or more services, wherein the one or more services:
        obtain a structured document including at least one first element that serves as an indicator of a type of information to be displayed in accordance with the structured document;
        generate a transformed structured document that includes the information and multiple second elements serving as an indicator for the information, wherein the at least one first element of the structured document is replaced by different of the multiple second elements in the transformed structured document, the multiple second elements being different from the first element, wherein rendering of the multiple second elements conveys the same information and the same visual appearance as rendering of the first element;
        generate a key of the first element and the multiple second elements; and
        provide the transformed structured document and the key to a client device in response to a request for a network resource.

8. The system of claim 7, wherein the structured document is transformed according to a nondeterministic function.

9. The system of claim 7, wherein the at least one first element includes at least one element identifier and at least one element class and wherein the multiple second elements include at least one element identifier and at least one element class and wherein the one or more services further cause the system to:
    associate a first element identifier with a second element identifier;
    associate a first element class with a second element class; and
    maintain a key of the associated first element identifier and second element identifier and the associated first element class and second element class.

10. The system of claim 7, wherein generating the structured document includes generating the structured document on a per-session identifier basis.

11. The system of claim 7, wherein the one or more services further cause the system to:
randomize a reference marker of the structured document using multiple transformations in response to the request; and
maintain a map of the reference marker and the randomized reference marker in a predetermined database, wherein the at least one first element is a comprises the reference marker and the multiple second elements are transformations of the first element.

12. The system of claim 7, wherein the one or more services further cause the system to:
determine a likelihood that a user is an automated-agent; and
based at least in part on the determined likelihood that the user is an automated-agent, increase a level of complexity by performing additional transformations to the structured document.

13. The system of claim 7, wherein the one or more services further cause the system to:
monitor a type of traffic, a frequency of traffic, or both; and
determine whether or not to transform the at least one first element based at least in part on the type of the traffic, the frequency of the traffic, or both.

14. One or more non-transitory computer-readable storage media having collectively stored thereon executable instructions that, as a result of execution by a computer system, cause the computer system to at least:
in response to receiving a request for a network resource from a requestor, create a markup document that includes at least one indicator of a type of information to be displayed in accordance with the network resource;
transform the at least one indicator in multiple ways to result in multiple transformed indicators;
associate the at least one indicator with the multiple transformed indicators to result in associated indicators;
reconfigure the markup document such that the at least one indicator of the markup document is transformed in a manner configured to cause a client device to use the associated indicators to display content of the associated indicators in the same manner as if the indicator was provided untransformed, wherein the markup document and the reconfigured markup document produce the same visual appearance; and
in response to the request, provide the associated indicators and the reconfigured markup document including the multiple transformed indicators to the requestor.

15. The one or more non-transitory computer-readable storage media of claim 14, further comprising instructions that, as a result of execution by one or more processors of the computer system, cause the computer system to transform at least one instance of the at least one indicator by substituting a first element type with a second element type.

16. The one or more non-transitory computer-readable storage media of claim 15, wherein the first element type is a HyperText Markup Language (HTML) DIV tag and the second element type is a customized HTML tag.

17. The one or more non-transitory computer-readable storage media of claim 14, further comprising instructions that, as a result of execution by one or more processors of the computer system, cause the computer system to:
determine, in response to receiving the request, whether the request was initiated by a known or identified automated-agent or an unknown or unidentified automated-agent; and
transform the at least one indicator in response to the determination and based at least in part on predetermined rules.

18. The one or more non-transitory computer-readable storage media of claim 14, further comprising instructions that, as a result of execution by one or more processors of the computer system, cause the computer system to:
maintain a historic rate of traffic at a webpage;
monitor a current rate of traffic at the webpage; and
compare the current rate of traffic to the historic rate of traffic and, based at least in part on the comparison, dynamically adjust a level of transformation of the network resource.

19. The one or more non-transitory computer-readable storage media of claim 14, further comprising instructions that, as a result of execution by one or more processors of the computer system, cause the computer system to select a transformed element from a predetermined database of transformed elements, wherein the predetermined transformed elements correspond to a predetermined set of instructions in a cached file, at a requestor device, wherein the requestor device displays a reconfigured element based at least in part on the predetermined set of instructions.

20. The one or more non-transitory computer-readable storage media of claim 14, further comprising instructions that, as a result of execution by one or more processors of the computer system, cause the computer system to:
determine a type of client; and
transform the at least one indicator in a fault tolerant design for the determined type of client.

* * * * *